US012464088B2

(12) United States Patent
Desai et al.

(10) Patent No.: US 12,464,088 B2
(45) Date of Patent: Nov. 4, 2025

(54) GAZE-BASED VIDEO CONFERENCE PROMPTS

(71) Applicant: Motorola Mobility LLC, Chicago, IL (US)

(72) Inventors: Rahul Bharat Desai, Hoffman Estates, IL (US); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 238 days.

(21) Appl. No.: 18/363,929

(22) Filed: Aug. 2, 2023

(65) Prior Publication Data

US 2025/0047811 A1 Feb. 6, 2025

(51) Int. Cl.
*H04N 7/15* (2006.01)
*G06F 3/01* (2006.01)
*G06F 3/04817* (2022.01)
*G06F 3/16* (2006.01)

(52) U.S. Cl.
CPC ............ *H04N 7/15* (2013.01); *G06F 3/013* (2013.01); *G06F 3/04817* (2013.01); *G06F 3/167* (2013.01)

(58) Field of Classification Search
CPC ......... G06F 3/012; G06F 3/013; G06F 3/017; G06F 3/04817; G06F 3/0482; G06F 3/04842; G06F 3/165; G06F 3/167; G06F 3/04886; G06F 9/453; G06T 7/20; G06T 7/70; G06V 10/98; G06V 40/20; G06V 10/462; G09G 5/14; H04L 65/403; H04L 12/1822; H04M 1/0264; H04N 7/147;
(Continued)

(56) References Cited

U.S. PATENT DOCUMENTS 5,861,936 A 1/1999 Sorensen
7,860,382 B2 12/2010 Grip
(Continued)

OTHER PUBLICATIONS

U.S. Appl. No. 18/537,545, "Corrected Notice of Allowability", U.S. Appl. No. 18/537,545, filed Aug. 15, 2024, 2 pages.
(Continued)

*Primary Examiner* — Gerald Gauthier
(74) *Attorney, Agent, or Firm* — FIG. 1 Patents

(57) ABSTRACT

Techniques for gaze-based video conference prompts are described that leverage eye-tracking algorithms within a video conference setting to perform a variety of functionality. For instance, a computing device displays a user interface of a video conference session that includes representations of video conference attendees. The computing device receives video content that depicts a user of the computing device and uses eye tracking techniques to determine a gaze location of the user based on the video content. The gaze location corresponds to one of the representations of an attendee. The computing device then communicates a prompt to one or more of the attendees that indicates the gaze location. In another example, the computing device detects a behavior of the user, e.g., a scanning behavior. Responsive to detection of the behavior, the computing device performs an action within the user interface, such as to display a roster view of the attendees.

20 Claims, 12 Drawing Sheets

(58) Field of Classification Search
CPC ...... H04N 7/15; H04N 7/157; H04N 21/4318; H04N 23/90; G02B 27/0172
See application file for complete search history.

(56) References Cited

U.S. PATENT DOCUMENTS

| | | | |
|---|---|---|---|
| 8,395,656 B1* | 3/2013 | Malzbender | H04N 21/4318 348/14.08 |
| 9,451,210 B1* | 9/2016 | Smus | G06F 3/012 |
| 9,538,130 B1* | 1/2017 | Ford | H04N 7/15 |
| 9,628,699 B2 | 4/2017 | Cheng et al. | |
| 9,661,215 B2 | 5/2017 | Sivan | |
| 10,241,545 B1 | 3/2019 | Richards et al. | |
| 10,466,484 B1 | 11/2019 | Yoon et al. | |
| 10,831,265 B2* | 11/2020 | Stellmach | G06F 3/013 |
| 11,050,975 B1* | 6/2021 | Petuchowski | H04N 7/15 |
| 11,410,331 B2 | 8/2022 | Kassis et al. | |
| 11,561,587 B2 | 1/2023 | Schenone et al. | |
| 11,677,899 B2 | 6/2023 | Vanka et al. | |
| 11,747,899 B2* | 9/2023 | Chen | G09G 5/14 715/722 |
| 11,758,260 B1 | 9/2023 | Agrawal et al. | |
| 11,889,178 B2 | 1/2024 | Agrawal et al. | |
| 12,022,182 B2 | 6/2024 | Desai et al. | |
| 12,167,120 B2 | 12/2024 | Agrawal et al. | |
| 12,375,610 B1* | 7/2025 | Swerdlow | H04L 65/403 |
| 2008/0080846 A1* | 4/2008 | Grip | H04M 1/0264 348/E5.045 |
| 2008/0297587 A1* | 12/2008 | Kurtz | G06V 40/20 348/E7.083 |
| 2010/0315482 A1* | 12/2010 | Rosenfeld | H04L 65/403 348/E7.083 |
| 2013/0076853 A1* | 3/2013 | Diao | H04N 7/157 348/E7.083 |
| 2013/0176208 A1 | 7/2013 | Tanaka et al. | |
| 2015/0163478 A1 | 6/2015 | Geiss et al. | |
| 2016/0156838 A1 | 6/2016 | Cheng et al. | |
| 2016/0234463 A1* | 8/2016 | Breedvelt-Schouten | H04N 7/147 |
| 2016/0261793 A1 | 9/2016 | Sivan | |
| 2017/0123526 A1 | 5/2017 | Trail et al. | |
| 2017/0184846 A1 | 6/2017 | Lu | |
| 2017/0364148 A1 | 12/2017 | Kim | |
| 2019/0065845 A1 | 2/2019 | Xu | |
| 2019/0076014 A1 | 3/2019 | Ryan et al. | |
| 2019/0260981 A1 | 8/2019 | Ollila | |
| 2019/0324530 A1* | 10/2019 | Stellmach | G06F 3/017 |
| 2020/0357184 A1 | 11/2020 | Paul et al. | |
| 2021/0096611 A1 | 4/2021 | Schenone et al. | |
| 2021/0104063 A1 | 4/2021 | Kassis et al. | |
| 2021/0133440 A1 | 5/2021 | Silverstein et al. | |
| 2021/0158049 A1 | 5/2021 | Leppänen et al. | |
| 2021/0258472 A1 | 8/2021 | Hamano | |
| 2021/0357637 A1 | 11/2021 | Fu et al. | |
| 2021/0360196 A1* | 11/2021 | Oz | G06F 3/013 |
| 2022/0311952 A1 | 9/2022 | Vanka et al. | |
| 2022/0334638 A1* | 10/2022 | Anderson | G06V 10/98 |
| 2022/0398869 A1* | 12/2022 | Wright | G06F 3/0482 |
| 2023/0071037 A1* | 3/2023 | Kim | G06F 3/04886 |
| 2023/0105206 A1* | 4/2023 | Condorovici | H04L 12/1822 348/14.08 |
| 2023/0113499 A1 | 4/2023 | Lee et al. | |
| 2023/0119205 A1* | 4/2023 | Agrawal | G06T 7/70 348/14.03 |
| 2023/0213729 A1 | 7/2023 | Huang et al. | |
| 2023/0276115 A1 | 8/2023 | Agrawal et al. | |
| 2023/0276116 A1 | 8/2023 | Agrawal et al. | |
| 2023/0281901 A1* | 9/2023 | Oz | G06T 7/20 345/419 |
| 2023/0298197 A1 | 9/2023 | Agrawal et al. | |
| 2023/0327897 A1* | 10/2023 | Condorovici | G06V 20/46 348/14.08 |
| 2023/0333642 A1* | 10/2023 | Chimalamarri | G06V 10/462 |
| 2023/0353398 A1* | 11/2023 | White | G06F 3/013 |
| 2023/0388620 A1 | 11/2023 | Desai et al. | |
| 2023/0418371 A1 | 12/2023 | Lutter | |
| 2023/0421622 A1* | 12/2023 | Agrawal | H04N 23/90 |
| 2024/0073048 A1* | 2/2024 | White | H04L 12/1818 |
| 2024/0114229 A1 | 4/2024 | Agrawal et al. | |
| 2024/0118746 A1* | 4/2024 | Yerkes | G06F 9/453 |
| 2024/0211204 A1* | 6/2024 | Gatzke | G06F 3/165 |
| 2025/0004548 A1* | 1/2025 | Duzinkiewicz | G02B 27/0172 |
| 2025/0005790 A1* | 1/2025 | Duzinkiewicz | G06F 3/013 |
| 2025/0047811 A1* | 2/2025 | Desai | H04N 7/15 |

OTHER PUBLICATIONS

U.S. Appl. No. 18/537,545, "Notice of Allowance", U.S. Appl. No. 18/537,545, filed Aug. 5, 2024, 15 pages.

U.S. Appl. No. 17/682,278, "U.S. Application as Filed", U.S. Appl. No. 17/682,278, filed Feb. 28, 2022, 69 pages.

U.S. Appl. No. 17/682,388, "Notice of Allowance", U.S. Appl. No. 17/682,388, filed Oct. 4, 2023, 17 pages.

U.S. Appl. No. 17/682,388, "U.S. Application as Filed", U.S. Appl. No. 17/682,388, filed Feb. 28, 2022, 70 pages.

U.S. Appl. No. 17/697,156, "U.S. Application as Filed", U.S. Appl. No. 17/697,156, filed Mar. 17, 2022, 50 pages.

Motorola, "Motorola Ready For", Motorola Mobility LLC. [retrieved Aug. 8, 2022]. Retrieved from the Internet <https://www.motorola.in/ready-for/p>., 13 Pages.

U.S. Appl. No. 17/697,156, "Final Office Action", U.S. Appl. No. 17/697,156, filed Mar. 21, 2024, 6 pages.

U.S. Appl. No. 17/825,679, "Corrected Notice of Allowability", U.S. Appl. No. 17/825,679, filed Jun. 3, 2024, 2 pages.

U.S. Appl. No. 17/825,679, "Notice of Allowance", U.S. Appl. No. 17/825,679, filed Apr. 23, 2024, 8 pages.

U.S. Appl. No. 17/697,156, "Non-Final Office Action", U.S. Appl. No. 17/697,156, filed Apr. 27, 2023, 14 pages.

U.S. Appl. No. 17/697,156, "Non-Final Office Action", U.S. Appl. No. 17/697,156, filed Dec. 8, 2023, 18 pages.

U.S. Appl. No. 17/825,679, "Non-Final Office Action", U.S. Appl. No. 17/825,679, filed Jan. 5, 2024, 13 pages.

* cited by examiner

GAZE-BASED VIDEO CONFERENCE PROMPTS

BACKGROUND

The modern work and educational models are in the midst of a paradigm shift from the traditional in-person setting to working/learning from home or remotely. As such, in today's intercommunication context, video conference meetings that include remote participants who are connected virtually have become commonplace. Video conference meetings remove the traditional confines associated with in-person meetings and increase flexibility by allowing attendees to participate in conversations despite varying geographical location. However, video conference meetings and events generate a host of new challenges. For instance, non-verbal communication is often limited in a virtual context which can be frustrating for users, reduce flexibility and efficiency, and offset the benefits associated with the remote work/educational model.

BRIEF DESCRIPTION OF THE DRAWINGS

Aspects of gaze-based video conference prompts are described with reference to the following Figures. The same numbers may be used throughout to reference similar features and components that are shown in the Figures.

DETAILED DESCRIPTION

Figure 1:
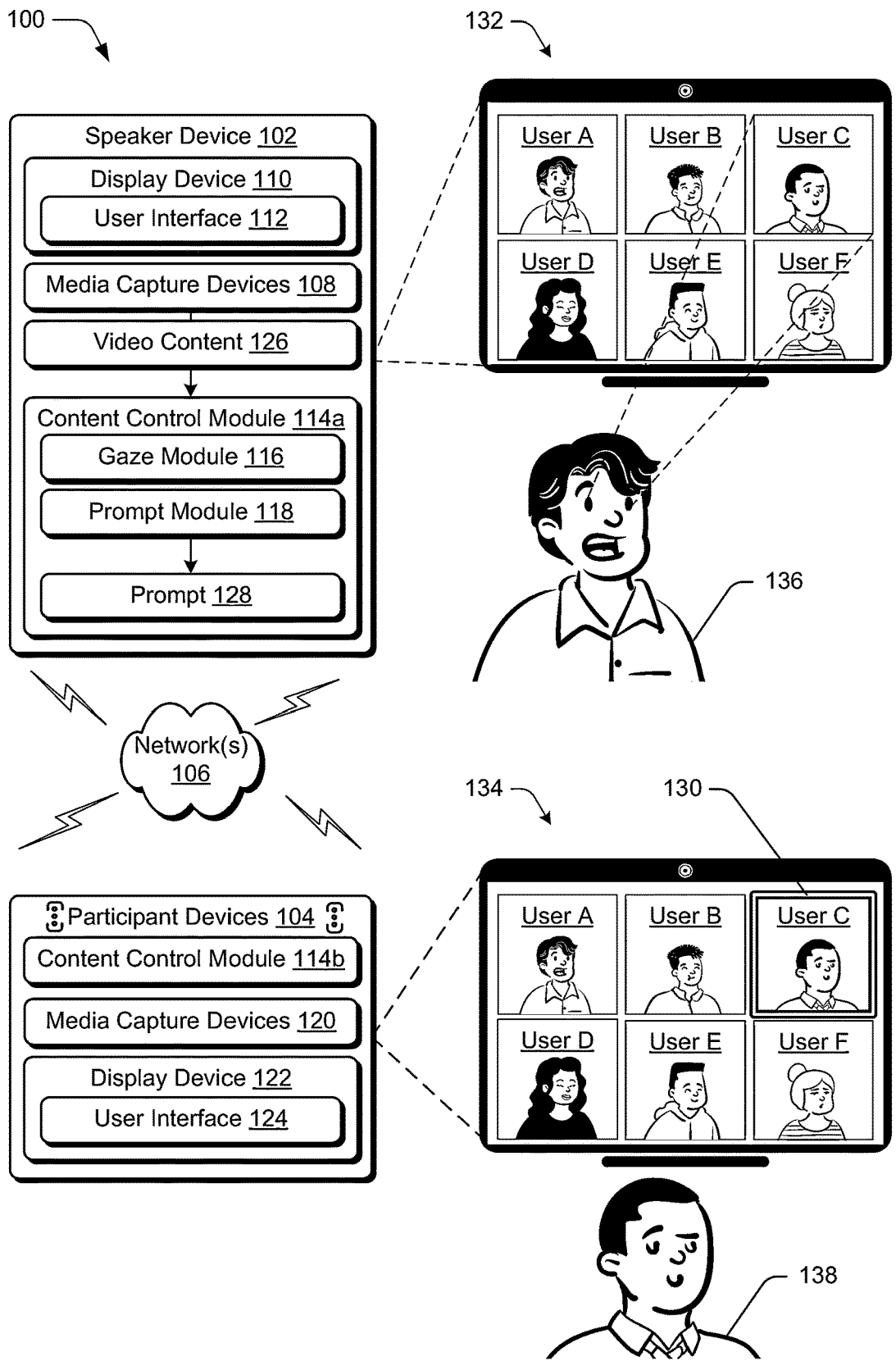
FIG. 1 illustrates an example environment in which aspects of gaze-based video conference prompts can be implemented.

Techniques for gaze-based video conference prompts are described and are implementable in a video conference setting to leverage eye tracking techniques and functionality to support an enhanced user experience. The described implementations, for instance, enable generation of a prompt that indicates where a speaker in a video conference session is looking. The described implementations further enable detection of user behaviors, e.g., a scanning behavior, and initiate corresponding actions based on the behaviors.

According to various implementations, a first computing device is communicatively coupled with at least one second computing device to enable video conferencing. The first and second devices are able to communicate audio and visual data in real time, such as through a video conferencing application. Accordingly, the first and second devices include media capture devices such as cameras and audio capture devices, as well as display devices such as display screens. In an example, the first device is a speaker device while the at least one second computing device is represented as one or more participant devices.

Consider, for instance, that a user of the speaker device is a teacher, and the video conference session is a class that includes a number of students. Accordingly, the participant devices are associated with respective students. The speaker device includes a video capture device as well as a display device to display a user interface, which includes representations of each of the students. As part of the class, the teacher wishes to call on a student named "Danny," however the class also includes a different student named "Dani." Using conventional techniques, the students are unsure whether the teacher is directing her question to Danny or Dani. However, the techniques described herein leverage eye-tacking functionality to resolve such potential sources of confusion.

For instance, responsive to a determination that the teacher is speaking, the speaker device receives video content captured by the video capture device that depicts a facial region of the teacher. The speaker device leverages one or more eye tracking techniques and/or algorithms to track eye movements of the teacher. For instance, the speaker device determines a gaze location of the teacher, e.g., a location of the user interface of the speaker device that the teacher maintains her gaze over a threshold amount of time. That is, the gaze location indicates where the teacher is looking within the user interface.

The speaker device then determines that the gaze location of the teacher corresponds to a location of a representation of a particular student. In other words, the gaze location indicates which student the teacher is looking at. In this example, while the teacher is speaking, she is looking at a representation of Danny which indicates that she is directing her question to Danny and not Dani. In some examples, the speaker device further collects audio data to validate the gaze location. For example, the speaker device collects audio data from the teacher and extracts one or more keywords and/or phrases. Continuing with the example, the speaker device identifies the word "Danny" to further validate that the teacher is looking at a representation of Danny instead of one of the other students.

The speaker device then communicates a prompt to one or more of the participant devices. Generally, the prompt indicates the gaze location of the user of the speaker device, which in this example is the teacher. In various examples, the prompt includes a visual cue to be displayed by the one or more participant devices that indicates that the user of the speaker device is looking at a representation of a particular user. For instance, the visual cue is an icon, a text-based message, badge, banner, and/or other visual effect that indicates that the teacher is looking at Danny. In this way, the students' computing devices are able to display a visual indication that the teacher is speaking to Danny, to prevent confusion and enhance a user experience.

In another example, the gaze-tracking capabilities of the techniques described herein are leveraged to determine one or more user behaviors and perform a corresponding functionality. Consider an example in which the teacher is lecturing a class with a relatively large number of students, e.g., thirty-six students, via a video conference session. The user interface of the video conference session thus does not include representations of all of the students on a single screen. Rather, the user interface displays a limited number of representations on a single "page" and is scrollable to access other pages with additional representations.

During the course of the lecture, the teacher wishes to look at a student named Jordan, however a representation of Jordan is not included in the subset of students displayed on a first page in the user interface. Thus, using conventional techniques the teacher is forced to scroll through multiple pages to locate a representation of Jordan, which is time consuming and inefficient. However, the techniques described herein leverage eye-tacking functionality to resolve such inefficiencies. For instance, the speaker device receives video content that depicts a facial region of the teacher and tracks her eye movements. The speaker device detects that a pattern of her eye movements corresponds to a behavior, such as a scanning behavior that indicates that the teacher is "searching" for a representation of a particular student.

Responsive to detection of the scanning behavior, the speaker device displays a roster view that includes a representation of each of the video conference participants in the user interface. The roster view, for instance, compresses the representations of the students such that each of the representations "fit" on a single page. In various examples, the speaker device further organizes the representations based on which representation the teacher is most likely searching for. This can be based on a variety of considerations, such as collected audio data, previous interactions within the video conference session, eye pattern data associated with the teacher, data associated with the respective students, etc. In this way, the roster view enables the teacher to quickly locate the representation of Jordan.

Once the teacher stops scanning, the speaker device determines that the scanning behavior has ceased and the eye movements of the user instead define a fixation behavior, e.g., the teacher's gaze is directed at the representation of Jordan. Responsive to the detection of the fixation behavior, an enlarged view of the representation of Jordan is displayed by the speaker device. The speaker device further communicates a prompt to one or more of the participant devices that the teacher is looking at Jordan. In this way, the techniques described herein provide a modality to improve user efficiency and enhance a user experience in an online video conference setting.

While features and concepts of gaze-based video conference prompts can be implemented in any number of environments and/or configurations, aspects of gaze-based video conference prompts are described in the context of the following example systems, devices, and methods. Further, the systems, devices, and methods described herein are interchangeable in various ways to provide for a wide variety of implementations and operational scenarios.

FIG. 1 illustrates an example environment 100 in which aspects of gaze-based video conference prompts can be implemented. The environment 100 includes a plurality of client devices, such as a speaker device 102 and one or more participant devices 104. While in this example a single participant device 104 is depicted, it should be understood that the environment can include a plurality of participant devices 104. Further, as described below in more detail, it should be understood that the one or more participant devices 104 are capable of performance of the same and/or similar operations as the speaker device 102, and the speaker device 102 is capable of the same and/or similar operations as the one or more participant devices 104.

The speaker device 102 and the one or more participant devices 104 are communicatively coupled via a wired or wireless connection, for instance via a network 106, such as part of a video conference session. The speaker device 102 and the one or more participant devices 104 are computing devices that can be implemented in a variety of different ways, such as a laptop computer, a desktop computer, a portable device that can be carried by a user (such as a smartphone or a tablet device), a docked mobile device connected to a monitor, and so forth. These examples are not to be construed as limiting, however, and the speaker device 102 and the one or more participant devices 104 can be implemented in a variety of different ways and form factors. Example attributes of the speaker device 102 and the one or more participant devices 104 are discussed below with reference to the device 800 of FIG. 8.

The speaker device 102 includes various functionality that enables the speaker device 102 to perform different aspects of gaze-based video conference prompts discussed herein, including media capture devices 108, a display device 110 displaying a user interface 112, and a content control module 114a. The content control module 114a is illustrated as including a gaze module 116 and a prompt module 118. The one or more participant devices 104 also include a content control module 114b, media capture devices 120, and a display device 122 displaying a user interface 124. While the functionality of the content control module 114a is primarily discussed with respect to the speaker device 102 in the following example, the same and/or similar functionality can be implemented by the content control module 114b of the one or more participant devices 104.

The media capture devices 108 are representative of functionality to enable various types of media to be captured via the speaker device 102, such as visual media and audio media, e.g., video content 126. In one or more examples, the media capture devices 108 include audio capture devices, video capture devices such as cameras, and a variety of other devices that are able to capture various types of media in accordance with the implementations discussed herein. The media capture devices 108 include not only hardware for capturing associated media but also logic (e.g., drivers, firmware, etc.) for operating and configuring operation of the associated media capture devices 108. The display device 110 represents functionality (e.g., hardware and logic) for enabling visual and/or video output via the speaker device 102 such as via the user interface 112. For instance, the display device 110 is implemented to display video content related to a video conference session in the user interface 112 between the speaker device 102 and the one or more participant devices 104.

The one or more participant devices 104 also include media capture devices 120, which are representative of functionality to enable various types of media to be captured via the one or more participant devices 104, such as visual media and audio media. In this particular example, the media capture devices 120 include audio capture devices and video capture devices such as cameras. The media capture devices 120, however, can include a variety of other devices that are able to capture various types of media in accordance with the implementations discussed herein. The media capture devices 120 include not only hardware for capturing associated media but also logic (e.g., drivers, firmware, etc.) for operating and configuring operation of the associated media capture devices 120. The one or more participant devices 104 also include a display device 122 displaying a user interface 124. The display device 122 represents functionality (e.g., hardware and logic) for enabling video output via the one or more participant devices 104. For instance, the display device 122 is implemented to display video content related to a video conference session in the user interface 124 between the speaker device 102 and the one or more participant devices 104.

The content control module 114a is implemented at least partially in hardware of the speaker device 102 to utilize the gaze module 116 to determine a gaze location of a user of the speaker device 102 relative to the user interface 112 based on video content 126 captured by the media capture devices 108. The content control module 114a further leverages the prompt module 118 to generate a prompt 128 to be communicated to the one or more participant devices 104. In one or more examples, this is performed responsive to a determination that the user is speaking. The prompt 128, for instance, indicates the gaze location of the user respective to the user interface 112. In some examples, the prompt 128 includes a visual cue 130 to be displayed by the one or more participant devices 104.

Alternatively or additionally, the content control module 114b is implemented at least partially in hardware of the one or more participant devices 104 to receive video content 126, e.g., from the speaker device 102, as well as user interface data that describes a layout of the user interface 112 and determine the gaze location. The content control module 114b is then operable to generate a visual cue 130 for display by the one or more participant devices 104. As further described below, the content control module 114a is further operable to detect a behavior based on the video content 126, e.g., a scanning behavior, and perform a variety of functionality responsive to detection of the behavior.

Example operations for gaze-based video conference prompts are shown in first stage 132 and a second stage 134. In the illustrated example, the speaker device 102 and a plurality of client devices that includes a participant device 104 are communicatively coupled for a video conference session. At first stage 132, the display device 110 displays a user interface 112 that depicts the video conference session. In this example, the user interface 112 includes a representation of a first user 136, denoted User A, that is a user of the speaker device 102. As illustrated, User A is speaking. The user interface 112 further includes representations of other attendees included in the video conference session such as User B, User C, User D, User E, and User F. Each attendee, for instance, is associated with a respective participant device 104.

In this example, the speaker device 102 captures video content 126 using the one or more media capture devices 108. Based on the video content 126, the gaze module 116 determines a gaze location of User A, such as "who" User A is looking at within the user interface 112. As illustrated, User A is looking at a representation in the user interface 112 that corresponds to User C, who is depicted in the second stage 134 at 138. The prompt module 118 then generates a prompt 128 to be communicated to the participant device 104, which in this example is a device of User C. The prompt 128 indicates the gaze location of User A, for instance that User A is looking at the representation of User C.

In various examples, the content control module 114a of the speaker device 102 further configures the prompt 128 to include a visual cue 130 for display by the participant device 104. Additionally or alternatively, the participant device 104 receives the prompt 128 from the speaker device 102 and generates the visual cue 130 for display by the display device 122. As illustrated in the second stage 134, the display device 122 of the participant device 104 displays the visual cue 130, which in this example is depicted as a double thickness line surrounding the representation of User C. In this way, User C is informed automatically and without user intervention that User A is "speaking to" User C. In some examples, the content control module 114a and/or the content control module 114b are further operable to communicate the prompt 128 to one or more additional participant devices 104, e.g., client devices of User B, User D, User E, and/or User F such as to inform the other video conference attendees that User A is speaking to User C. Thus, the techniques described herein support an enhanced user experience and increased user efficiency within a video conference session.

Having discussed an example environment in which the disclosed techniques can be performed, consider now some example scenarios and implementation details for implementing the disclosed techniques.

Figure 2:
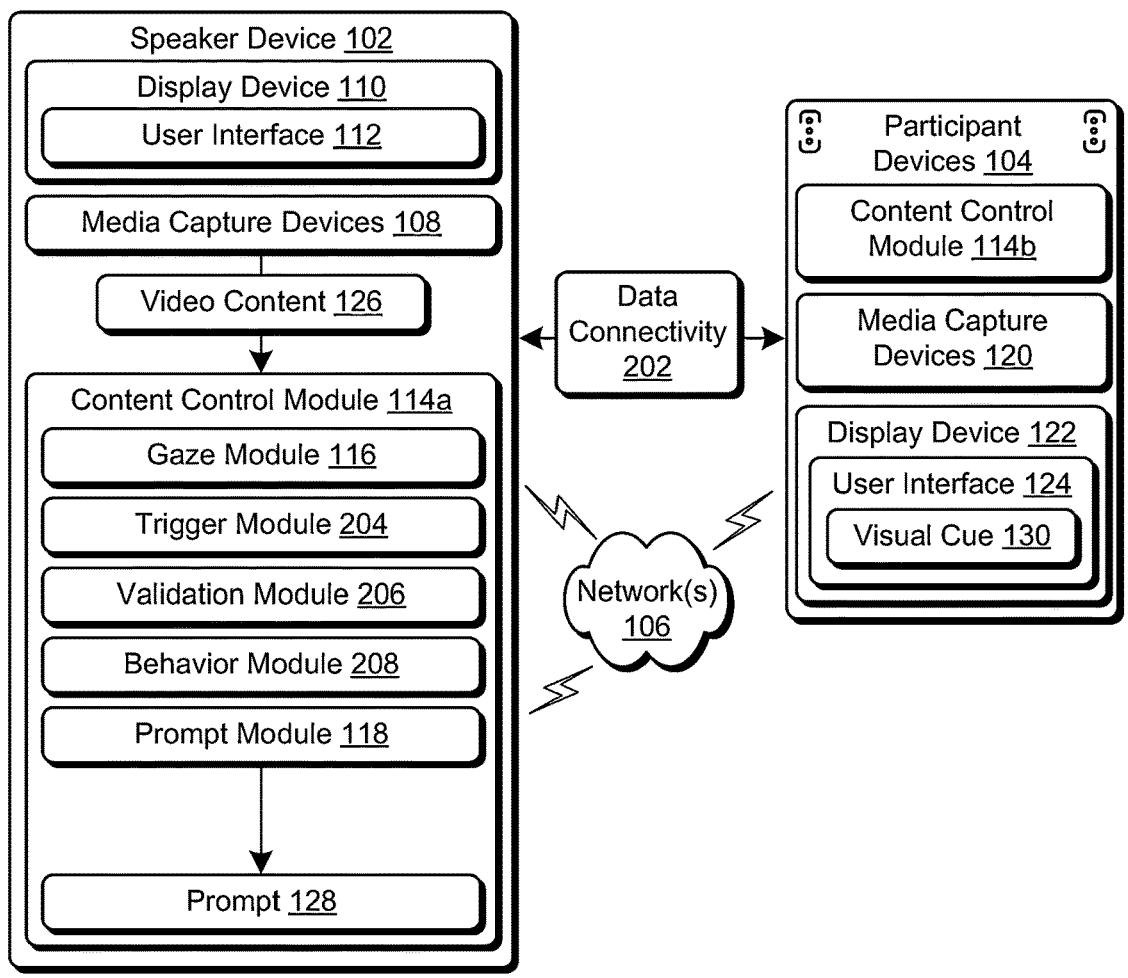
FIG. 2 depicts an example system for gaze-based video conference prompts in accordance with one or more implementations.

FIG. 2 depicts an example system 200 for gaze-based video conference prompts in accordance with one or more implementations. The system 200 can be implemented in the environment 100 and incorporates attributes of the environment 100 introduced above. In the example system 200, the speaker device 102 and the one or more participant devices 104 interface to establish data connectivity 202. In this example, the speaker device 102 is communicatively coupled to a plurality of participant devices 104. The data connectivity 202 is implemented via wireless and/or wired connectivity between the speaker device 102 and the participant devices 104 for exchanging data between the devices.

The data connectivity 202, for instance, is implemented via direct wireless and/or wired connectivity between the speaker device 102 and the participant devices 104 and/or via data communication over the network 106 between the speaker device 102 and the participant devices 104. In a wireless scenario the data connectivity 202 can be established as direct device-to-device connectivity between one or more of the speaker device 102 and the participant devices 104 utilizing any suitable wireless protocol, such as Wi-Fi Direct, Bluetooth™ (including Bluetooth™ Low Energy (BLE), ultra-wideband (UWB), Near Field Communication (NFC)), LTE direct, NR sidelink, and so forth.

The speaker device 102 includes a display device 110 that is configured to display a user interface 112. In an example, the user interface 112 depicts a video conference session between the speaker device 102 and one or more participant devices 104. As part of the video conference session, the user interface depicts representations of users of each of the plurality of participant devices 104. The representations can include a variety of digital content, such as live video of the respective users, still digital images, icons, text, etc. An example representation includes a tile that displays a video feed of the users, such as video captured by respective participant devices 104. In some examples, the user interface 112 further includes a representation of the user of the speaker device 102, e.g., live video of the user.

The representations are configurable in a variety of ways, styles, and/or layouts. For instance, the user interface 112 may display the representations as part of a speaker view that prominently displays a video feed of an individual who is speaking, with representations of other participants displayed as smaller thumbnails or tiles. In another example, the user interface 112 displays a gallery view, in which multiple representations are displayed in a grid-like configuration, e.g., for nine individuals a 3×3 grid is displayed. In some examples, such as for video conference sessions with a large number of attendees, the user interface 112 may display multiple pages of gallery views that are scrollable to view different representations. This is by way of example and not limitation, and a variety of display configurations are considered such as a full-screen mode, compact mode, customized layouts, share-screen mode, etc.

The example system 200 shows operation of the content control module 114a, which is illustrated as including a gaze module 116, a prompt module 118, a trigger module 204, a validation module 206, and a behavior module 208. In an example, the speaker device 102 and the participant devices 104 are communicatively coupled as part of a video conferencing session. The content control modules 114a, 114b, for example, are implemented by and/or in conjunction with a video conferencing application that supports video and audial communication between the speaker device 102 and the participant devices 104 in real time. Media capture devices 108 such as audio sensors and video capture devices including cameras are operable to capture video content 126 from an environment surrounding the speaker device 102. In one or more examples, the media capture devices 108 include one or more wide or ultra-wide-angle cameras. The video content 126, for instance, includes visual and audial attributes to depict a scene in the environment as part of the video conference session. In various examples, the video content 126 depicts a user of the speaker device 102.

The content control module 114a is configured to receive the video content 126, e.g., as captured by a video capture device of the speaker device 102. In this example, the video content 126 depicts a facial region of a user of the speaker device 102. In various examples, the content control module 114a is operable to process the video content 126 to isolate the facial region of the user and/or implement one or more editing operations to support efficient eye-tracking, e.g., autofocus operation to identify a region of interest within the video content 126, smart cropping to isolate a region of interest, auto-adjustment of lighting features to locate pupils, facial retouching operations, etc. Based on the video content 126, the gaze module 116 employs one or more eye tracking techniques and/or algorithms to track eye movements of the user of the speaker device 102.

For instance, the gaze module 116 is operable to track, record, measure, quantify and/or analyze movements of the user's eyes. In an example, the gaze module 116 detects and records parameters associated with movement of the user's eyes such as one or more gaze points (e.g., a specific location on the display device 110 where the user is looking at a particular moment), fixations (e.g., periods of relatively stable eye positions during which the eyes are focused on a specific point of interest), saccades (e.g., rapid eye movements that shift the gaze from one point to another), pupil size, eye movement metrics (e.g., velocity, acceleration, blink rate), eye scanning patterns, etc. In one example, the speaker device 102 includes one or more infrared cameras/sensors, and the gaze module 116 leverages these along with an eye tracking algorithm as part of the eye tracking. This is by way of example and not limitation, and a variety of eye tracking techniques are considered.

Accordingly, in one example the gaze module 116 determines a gaze location of the user relative to the user interface 112 based on the video content 126. Generally, a gaze location represents a point/area that the user of the speaker device 102 is looking at a particular moment in time. For instance, the gaze location represents an area of the user interface 112 that the user's gaze is fixated on for over a threshold amount of time.

In one example, the gaze module 116 is operable to determine that the gaze location corresponds to one or more elements displayed in the user interface 112, such as one or more representations of users of the participant devices 104. As described above the user interface 112 can include representations of users of the participant devices 104 as part of the video conference session such as tiles that depict live video of the respective users, still digital images, icons, text, etc. Locations of the representations are definable in a variety of ways, such as coordinates, dimensions, grid systems, etc. The gaze module 116 is thus operable to determine coordinates of the gaze location and determine that the gaze location corresponds to a location of a particular representation that depicts a particular user. In this way, the gaze module 116 is able to determine "who" the user of the speaker device 102 is looking at. Further, the gaze module 116 is operable to identify the particular user, e.g., identify the particular user by name using information obtained as part of the video conference session.

In various examples, the content control module 114a includes a validation module 206 that is operable to validate the gaze location, such as against auditory data collected by the speaker device 102. By way of example, the speaker device 102 collects auditory data using the media capture devices 108 in the course of the video conference session. The auditory data includes information related to speech, language, noises, audio content, etc. generated by the user and/or the user's environment as part of the video conference session. The validation module 206 is operable to analyze the auditory data, such as to perform speech recognition to identify speech elements such as particular words, sentences, names, phenomes, etc.

The validation module 206 can then compare detected speech elements to identity information obtained in accordance with the techniques described above. In an example, the gaze module 116 determines that the gaze location corresponds to a representation of a particular user and further determines a name of the particular user. The validation module 206 is operable to analyze the auditory data to extract speech elements that indicate that the user of the speaker device 102 is speaking to the particular user, such as the name of the particular user. In this way, the techniques described herein provide an added level of verification to determine who the user is speaking to.

In some implementations, the content control module 114a includes a trigger module 204 that is operable to detect one or more triggers to initiate eye tracking functionality. For instance, the trigger module 204 causes the gaze module 116 to track the user's gaze and/or detect one or more user behaviors responsive to detection of the one or more triggers. In one example, the trigger includes a determination that the user of the speaker device 102 is speaking. The trigger module 204 leverages the media capture devices 108, e.g., one or more audio sensors and/or cameras, to do so. Additionally or alternatively, the trigger module 204 initiates eye tracking responsive to a determination that the video conference session includes a number of participants within a specified range, over a threshold, under a threshold, etc.

Accordingly, once the gaze module 116 has determined a representation that the user is looking at, the content control module 114a leverages a prompt module 118 to generate a prompt 128 for communication to one or more of the participant devices 104. Generally, the prompt 128 indicates the gaze location of the user of the speaker device 102, e.g., "who" the user is looking at. In one example the speaker device 102 communicates the prompt 128 to the participant device 104 associated with the representation that the user is looking at, e.g., the individual that the user is speaking to. Thus, the individual is notified that the user is speaking to the individual. Additionally or alternatively, the speaker device 102 communicates the prompt 128 and/or an additional prompt to each of the participant devices 104 included in the video conference session to further inform attendees of the video conference session who the user is looking at.

In various examples, the prompt 128 includes a visual cue 130 to be displayed by one or more of the participant devices 104 that indicates that the user, e.g., a speaker, is looking at a representation of a particular user. The visual cue 130, for instance, can include an icon, a text-based message, badge, banner, and/or other visual effects to be displayed by one or more of the participant devices 104. In some examples, the prompt 128 further includes an auditory cue instead of or in addition to the visual cue 130. Generally, the auditory cue indicates which representation the user of the speaker device 102 is looking at. For instance, the auditory cue can include a variety of noises and/or changes to existing audio, such as an adjustment to one or more audial settings, e.g., volume, equalizer settings, balance, etc. In one example, the auditory cue includes an adjustment to spatialized sound settings, such as to adjust audio to sound like it is "coming from" a direction that corresponds to the speaker.

Additionally or alternatively, the content control module 114b of one or more of the participant devices 104 is operable to receive the prompt 128 and generate the visual cue 130 for display such as in accordance with the techniques described above. In one example, the content control module 114b of a particular participant device 104 is operable to detect that the user of the speaker device 102 is speaking and identify the user as a speaker. The content control module 114b then receives the prompt 128 from the speaker device 102. Based on the prompt 128, the content control module 114b generates the visual cue 130 for display that indicates that the speaker is looking at a representation of a user of the particular participant device 104. In some examples, the content control module 114b further receives video data and user interface data from the speaker device 102 and determines the gaze location of the speaker based on the video data and the user interface data. Thus, the techniques described herein are implementable in a variety of ways by either/both the speaker device 102 and/or the participant devices 104.

In some examples, the content control module 114a includes a behavior module 208 that is operable to classify one or more behaviors of the user of the speaker device 102, such as based on eye tracking data. A variety of behaviors are considered, such as a reading behavior in which the user is reading text, a sleeping behavior in which the user is tired and/or sleeping, a scanning behavior in which the user is looking around the user interface 112, a fixation behavior in which the user is fixated on a point and/or representation, etc. By way of example, the behavior module 208 leverages one or more algorithms to determine that eye movements of the user define a scanning behavior, e.g., the user is "searching" for a particular representation. For instance, the eye movements indicate that the user is looking up/down and/or side-to-side respective to the user interface 112 without fixating on a particular representation. In some examples, detection of the scanning behavior includes determining that the eye movements match a predefined scanning pattern which can be user defined and/or defined automatically.

Responsive to detection of the behavior, the behavior module 208 is operable to perform and/or initiate a variety of actions and/or functionality that correspond to the identified behavior. In one example, the behavior module 208 detects a sleeping behavior, e.g., that the user is "drifting off" based on blink patterns, closed eyes, nystagmus patterns, etc. Responsive to the detection of the sleeping behavior, the behavior module 208 is operable to provide an auditory cue to the user, e.g., to recapture the user's attention. In an additional example, the behavior module 208 detects a reading behavior the indicates that the user is reading text displayed in the user interface 112, e.g., based on the user's gaze, pupillary distance/dilation, and squint behaviors. The behavior module 208 further uses gaze tracking to determine a location of the text. The behavior module 208 is then operable to enlarge the text to support ease of reading for the user.

In yet another example, the video conference session includes a large number of individuals, such that the user interface 112 generally displays representations of a subset of the individuals in multiple pages. However, responsive to the detection of a scanning behavior, the behavior module 208 initiates display of a roster view in the user interface 112 that displays a representation of each of the individuals included in the video conference session in a single page. Thus, the user can quickly and efficiently locate a particular representation.

Continuing with the above example, the user ceases the scanning behavior and fixates on a particular representation within the roster view. The behavior module 208 detects that the eye movements of the user define a fixation behavior, e.g., the gaze of the user is fixated on a particular location. Responsive to the fixation behavior, the behavior module 208 changes the display within the user interface 112, such as to enhance (e.g., enlarge) the particular representation. Further, the speaker device 102 can communicate a prompt 128 to the participant device 104 associated with the particular representation in accordance with the techniques described above, such as to inform a user of the participant device 104 where the user of the speaker device 102 is looking.

In some examples, the behavior module 208 generates the roster view based on a likelihood that the user is scanning for a particular representation. For instance, the behavior module 208 prioritizes representations that the user is likely searching for and generates the roster view to prominently display the prioritized representations. For instance, the roster view displays prioritized representations "first" such as according to a natural reading order, e.g., located in the top left portion of the user interface 112. Accordingly, representations that the user is "less likely" looking for are located in a bottom right portion of the user interface 112. This is by way of example and not limitation, and the behavior module 208 can organize representations included in the roster view in a variety of ways and based on a variety of considerations, such as collected audio data, previous interactions within the video conference session, eye pattern data associated with the user, data associated with the respective participants of the video conference session, etc.

Consider an example in which a user of the speaker device 102 is a teacher and the video conference session pertains to a math class to instruct students. The behavior module 208 can configure the roster view based on previous interactions within the video conference and/or data associated with the students, such as to prioritize students that have been called on infrequently. Additionally, or alternatively, the behavior module 208 configures the roster view based on eye pattern data of the user of the speaker device 102 such as to position representations based on a scanning pattern particular to the user. For instance, the scanning pattern of a user includes vertical eye movements, e.g., looking up and down to locate a representation. The behavior module 208 thus configures the roster view to align with the natural scanning pattern of the user to further enhance the user experience as further discussed below with respect to FIGS. 4a, 4b, and 4c.

In an additional or alternative example, the behavior module 208 leverages audio data to configure the roster view. For instance, the behavior module 208 identifies that the user says a name concurrent with the scanning behavior, and thus prioritizes representations that correspond to the name. The behavior module 208 is further operable to prioritize representations based on other audial content, such as key words and/or content spoken by the user. In one example, the behavior module 208 detects that the user of the speaker device 102 is speaking about particular content that is relevant to one or more of the individuals in the video conference session. For instance, the behavior module 208 determines that the particular content pertains to a particular job within an organization, e.g., human resources, and several individuals within the video conference session have an organizational classifier that denotes the individuals as having the particular job. Thus, the behavior module 208 generates the roster view to prioritize representations of the individuals with the particular job.

In some examples, the number of attendees included in the video conference session is such that the roster view is unable to display representations of each of the attendees within a single view. For instance, the representations do not "fit" on one page. Accordingly, the behavior module 208 is operable to automatically "scroll" through the representations of attendees to show the user each of the representations. Thus, the techniques described herein provide a modality to improve user efficiency and enhance a user experience in an online video conference setting.

Figure 3A:
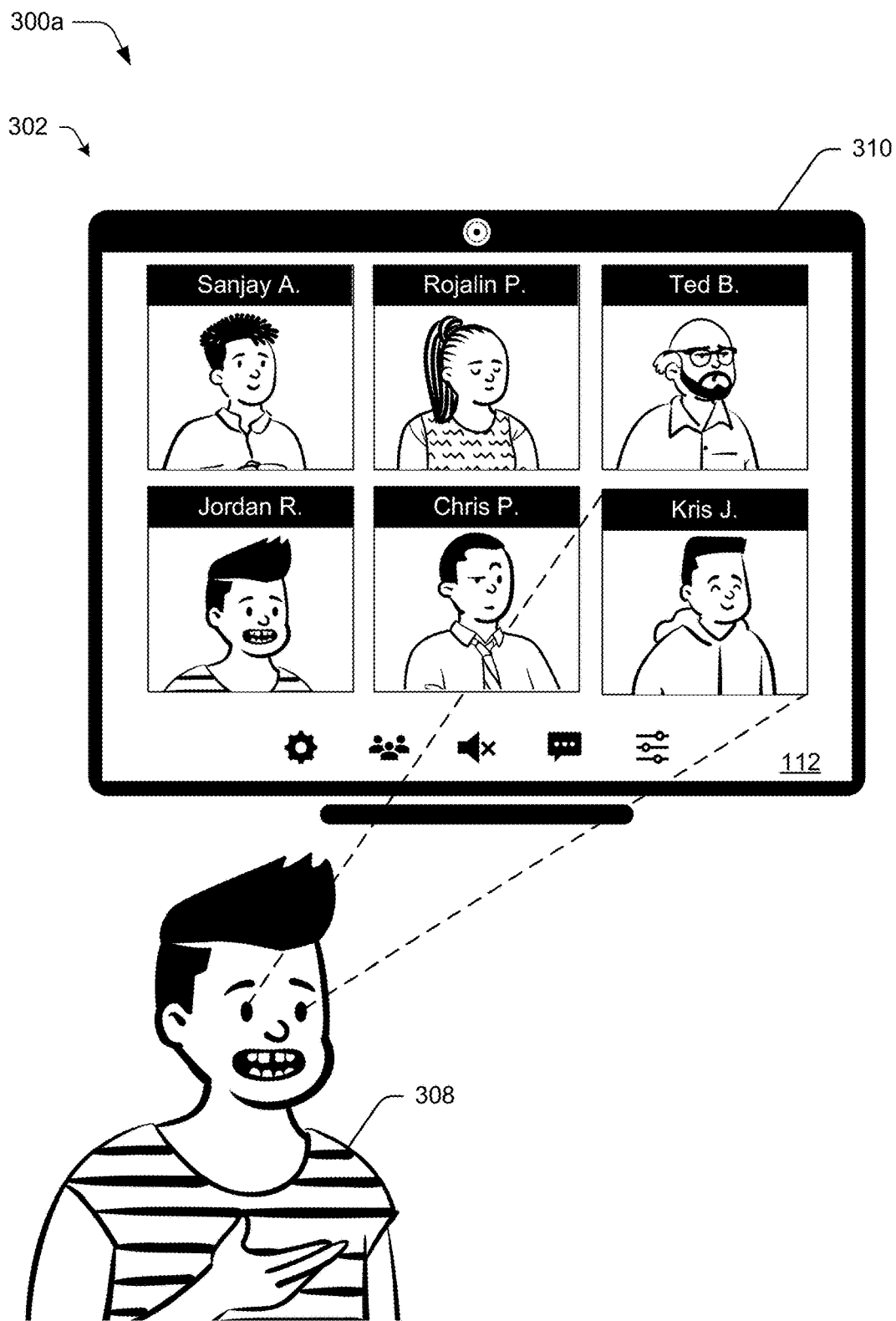
FIGS. 3a, 3b, and 3c depict example implementations for gaze-based video conference prompts in which a prompt that indicates a gaze location of a user is generated in accordance with one or more implementations.
Figure 3B:
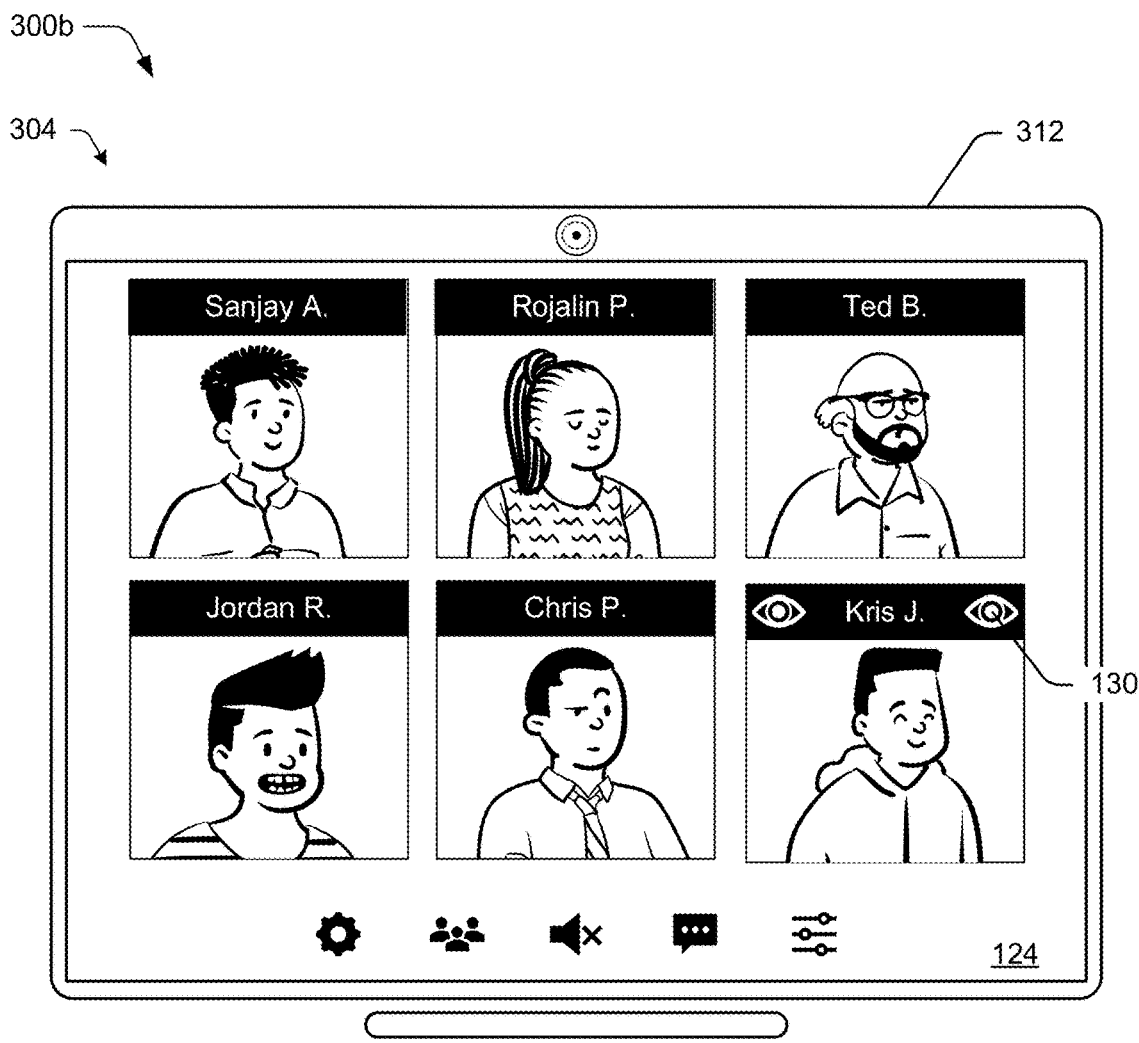
Figure 3B:
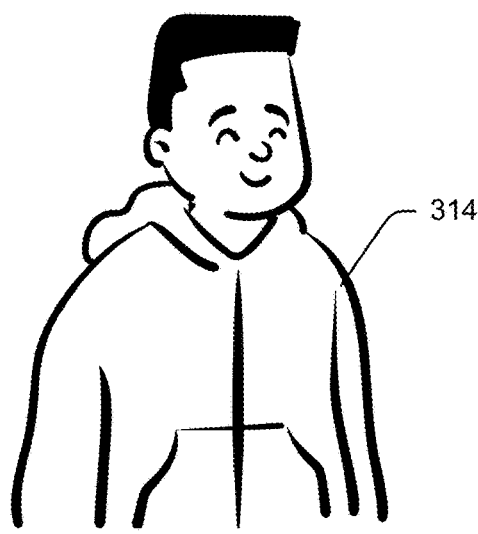
Figure 3C:
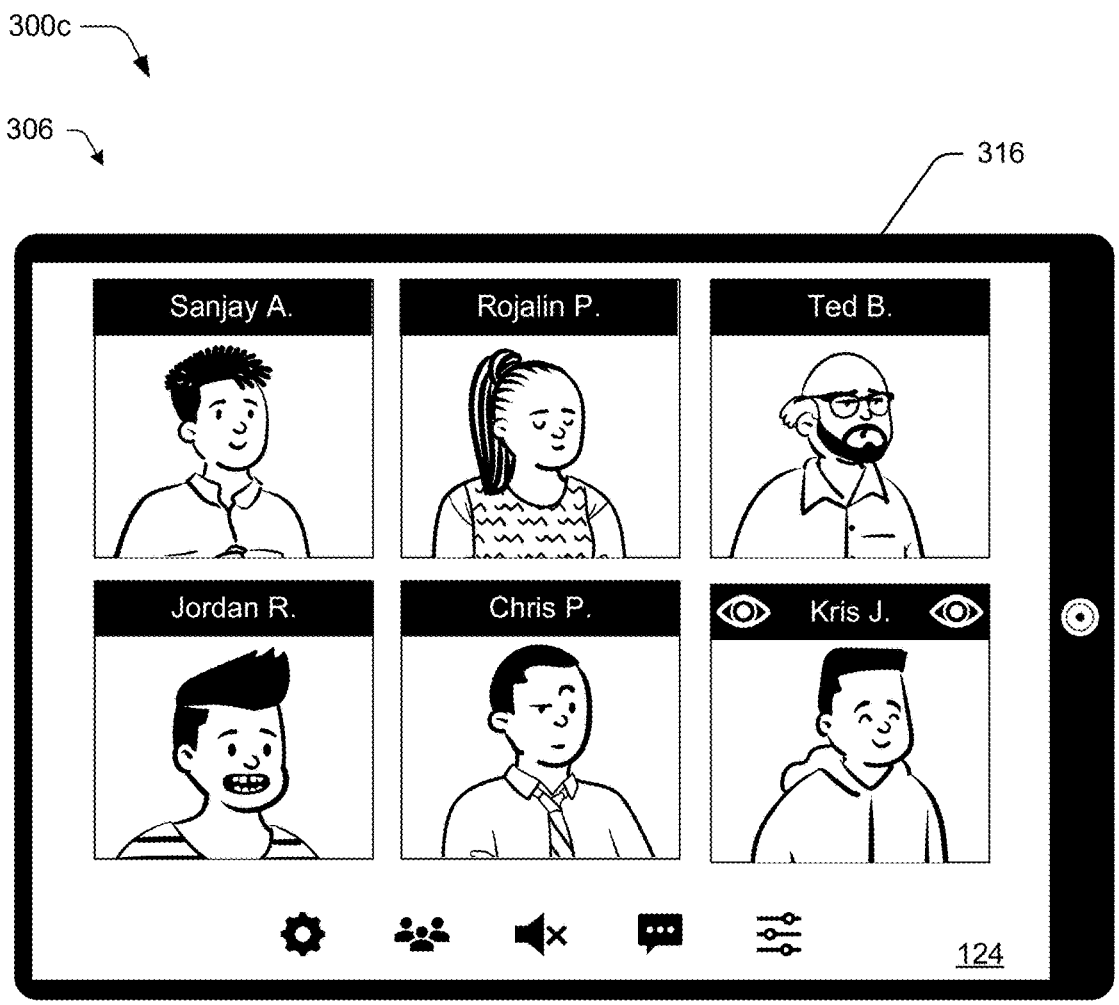
Figure 3C:

FIGS. 3a, 3b, and 3c depict example implementations 300a, 300b, and 300c for gaze-based video conference prompts in which a prompt that indicates a gaze location of a user is generated in a first stage 302, a second stage 304, and a third stage 306. As depicted in the first stage 302, multiple attendees are remotely connected as part of a video conference session. For instance, first stage 302 depicts a first user 308, in this example denoted "Jordan R." that is associated with a first client device 310. The first client device 310 is representative of a speaker device 102 as described above.

A user interface 112 of the first client device 310 includes representations for each attendee, as well as a representation of the first user 308. The first user 308 is speaking to an individual named Kris, however the video conference session also includes an individual by the name of Chris. Accordingly, conventional scenarios could cause user confusion as to who the first user 308 is speaking to. Using the techniques described herein, however, the first client device 310 determines a gaze location of the first user 308 responsive to a determination that the first user 308 is speaking. In this example, the gaze location corresponds to a representation of Kris J. The first client device 310 then generates a prompt 128 that indicates the gaze location.

As shown in second stage 304 of FIG. 3b, the first client device 310 communicates the prompt 128 to a second client device 312. In this example, the second client device 312 is representative of a participant device 104 as described above. Further, the second client device 312 is associated with a second user 314, which in this example is "Kris J."

The prompt 128 further includes a visual cue 130, which in this example is an eye-shaped icon that is included in the representation of the second user 314. In this way, the second user 314 is automatically informed that the first user 308 is looking at, and speaking to, the second user 314.

As shown in the third stage 306 of FIG. 3c, the first client device 310 further communicates the prompt 128 to a third client device 316. In this example, the third client device 316 is representative of a participant device 104 as described above. Further, the third client device 316 is associated with a third user 318, which in this example is "Chris P." The prompt 128 further includes the visual cue 130, e.g., the eye-shaped icon that is included in the representation of the second user 314. In this way, the third user 318 is automatically informed that the first user 308 is speaking to the second user 314, instead of the third user 318. Thus, the techniques described herein enhance a user experience and eliminate sources of confusion in an online video conference setting which is not possible using conventional techniques.

Figure 4A:
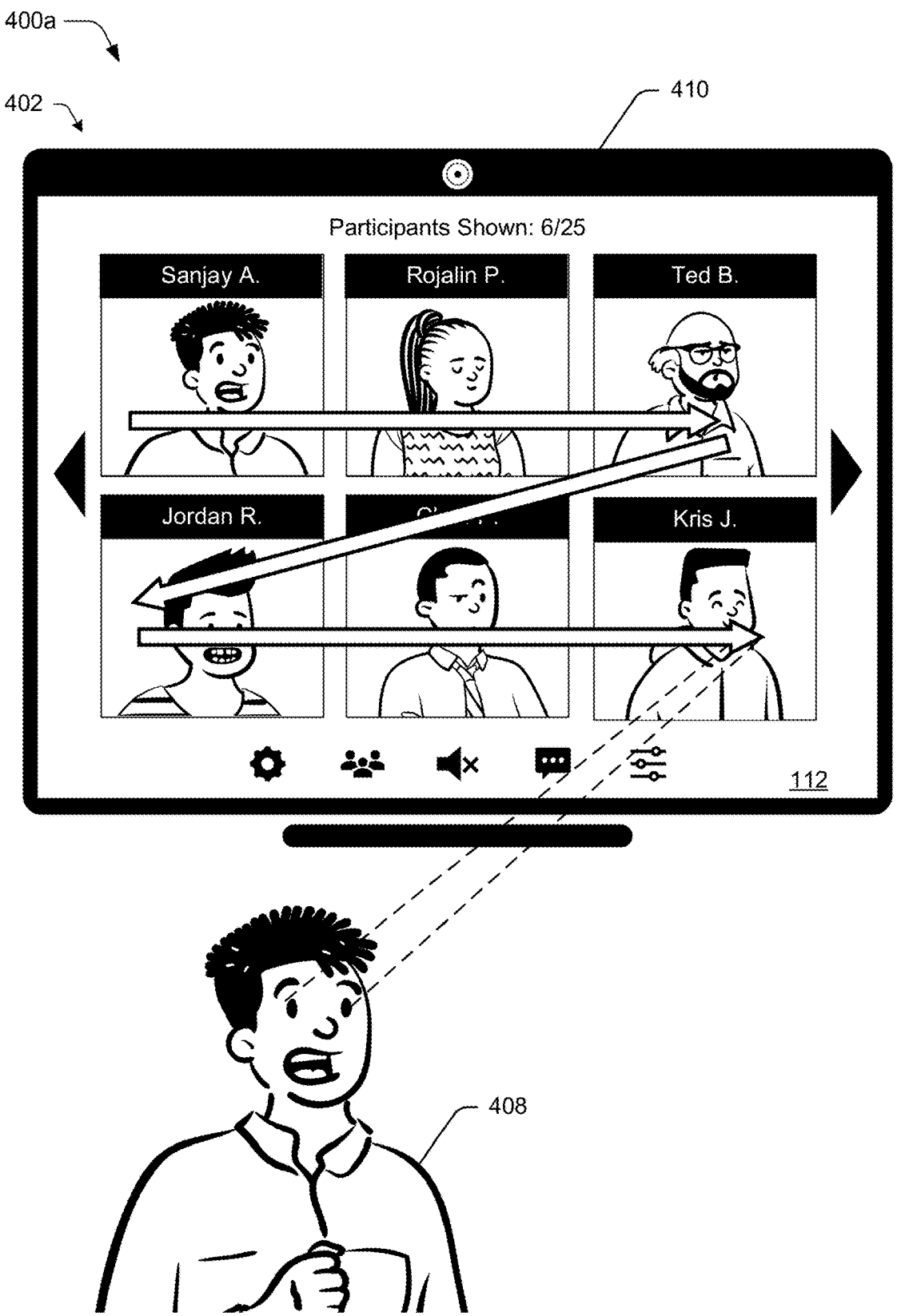
FIGS. 4a, 4b and 4c depict example implementations for gaze-based video conference prompts in which a roster view is displayed responsive to detection of a scanning behavior in accordance with one or more implementations.
Figure 4B:
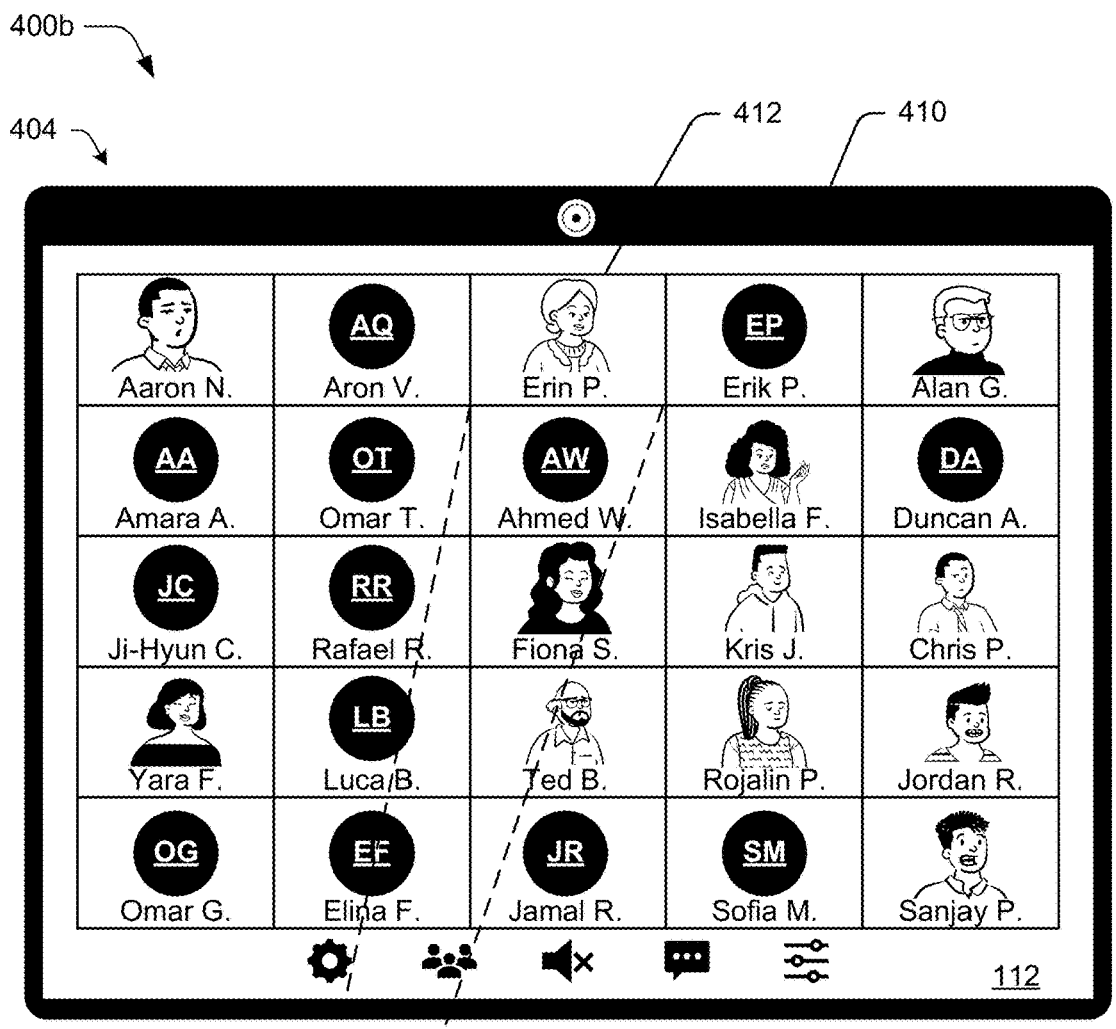
Figure 4B:
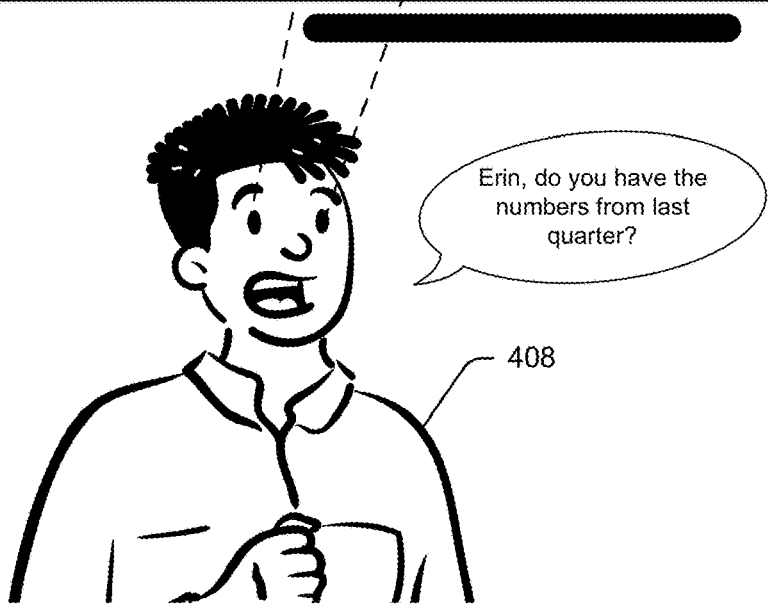
Figure 4C:
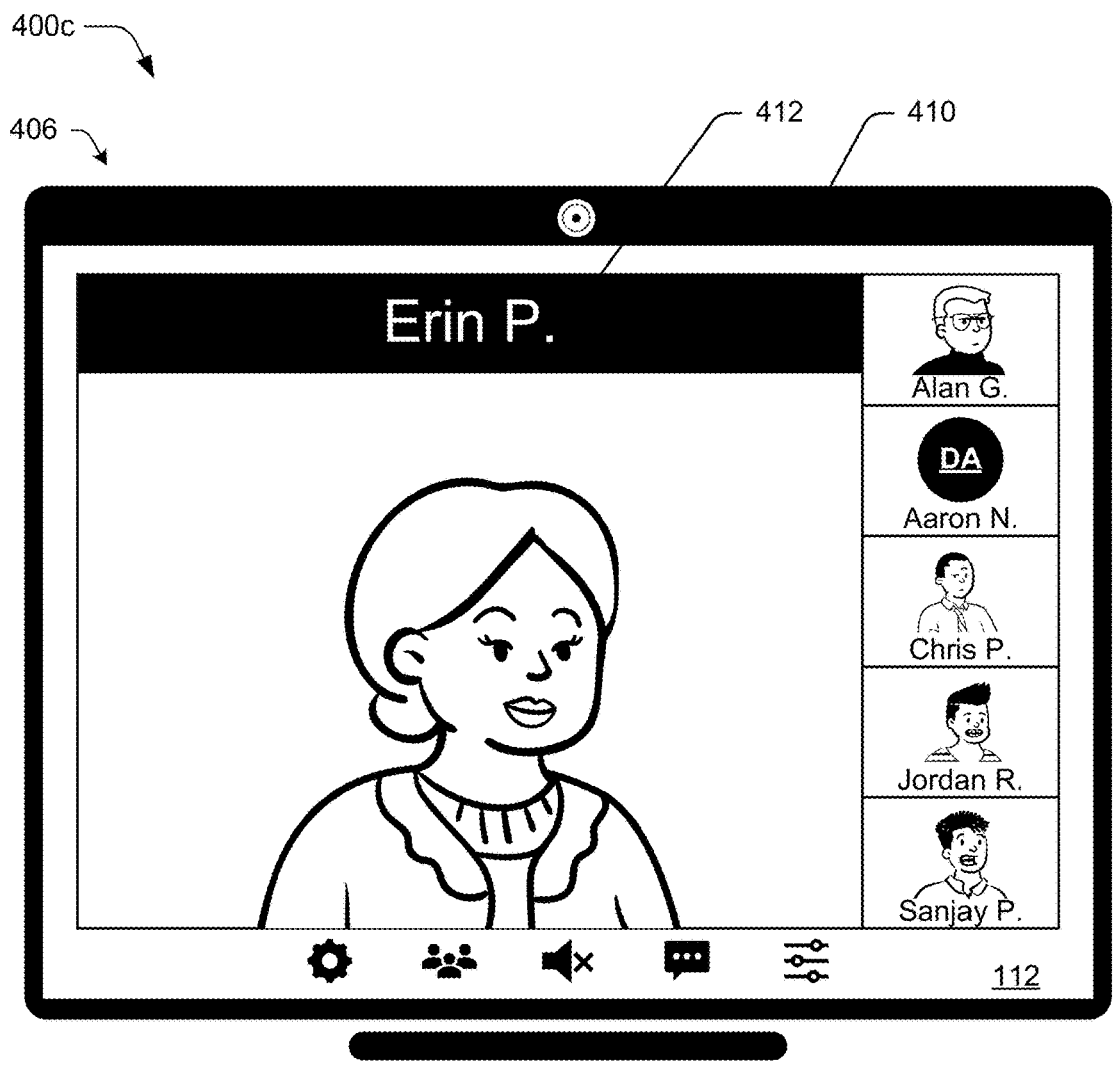
Figure 4C:
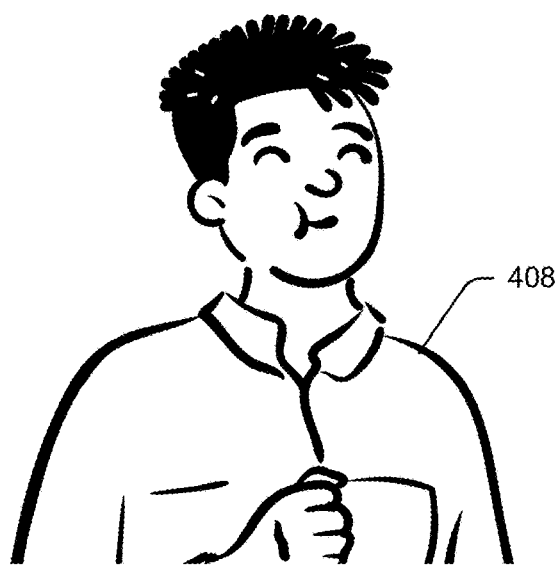

FIGS. 4a, 4b and 4c depict an example implementations 400a, 400b, and 400c for gaze-based video conference prompts in which a roster view is displayed responsive to detection of a scanning behavior in a first stage 402, a second stage 404, and a third stage 406. As depicted in the first stage 402, multiple participants are remotely connected as part of a video conference session. For instance, first stage 402 depicts a first user 408, in this example denoted "Sanjay A." that is associated with a user device 410. The user device 410, for instance, is representative of a speaker device 102. A user interface 112 of the user device 410 includes representations for each participant, as well as a representation of the first user 408. However, the video conference session includes a number of participants over a threshold (e.g., twenty-five attendees) and thus the user interface 112 displays a subset (e.g., six) of the participants on a first page.

In the illustrated example, the first user 408 is looking for a particular participant. Using conventional techniques, the first user 408 is forced to scroll through multiple pages to locate the particular participant, which is time consuming and inefficient. To overcome these limitations, the user device 410 receives video content that depicts a facial region of the first user 408 and tracks eye movements of the first user 408 based on the video content. The user device 410 then detects that the eye movements correspond to a scanning behavior, e.g., that the first user 408 is searching for a particular representation. The white arrows in this example denote the eye movements of the first user 408, which corresponds to a scanning pattern.

As shown in the second stage 404 of FIG. 4b, the user device 410 displays a roster view responsive to the detection of the scanning behavior. The roster view includes representations for each participant included in the video conference session. In this example, some of the representations include live video of the respective participants, while other representations include icons with initials of the respective participants. In this example, the user device 410 configures the roster view based on a likelihood that the user is scanning for a particular representation. For instance, the user device 410 configures the roster view to include representations that the first user 408 is likely looking for towards the top left of the user interface 112, while representations that that the first user 408 is unlikely to be looking for are located towards the bottom right of the user interface 112, e.g., the representation of the first user 408.

Further, the ordering of the representations is based on the scanning pattern depicted in the first stage 402. For instance, the scanning pattern of the first user 408 depicted in FIG. 4a is a Z-shaped pattern. Accordingly, the user device 410 organizes the representations included in the roster view to match the scanning pattern in a similar Z-shaped configuration, e.g., top row left to right, then second row left to right, and so forth. Thus, the user device 410 leverages previously obtained knowledge about the first user's 408 natural scanning behavior to configure the roster view. In this way, the roster view is configured to support improved searchability to enhance a user experience.

The priority of each representation, e.g., the likelihood that the first user 408 is looking for a particular representation, is based on audial data obtained from the first user 408. For instance, the user device 410 detects that the first user 408 uses the name "Erin" while speaking and thus it is likely that the first user 408 is talking to Erin. Accordingly, the representations that include names that sound similar to Erin are designated as "high likelihood" and included in the top left, e.g., Aaron, Aron, Erin, Erik, etc, thus, the first user 408 is able to quickly locate the representation of Erin P.

As shown in the third stage 406 of FIG. 4c, the user device 410 then determines that the scanning behavior has ceased and the eye movements of the first user 408 define a fixation behavior. For instance, a gaze of the first user 408 corresponds to a location of a particular representation, such as a representation of a second user 412. Responsive to the detection of the fixation behavior, the user device 410 displays an enlarged view of the representation of the second user 412. Although not depicted in the illustrated example, the user device 410 is further operable to communicate a prompt 128 to one or more devices included in the video conference session, such as a client device of the second user 412, in accordance with the techniques described above.

Figure 5:
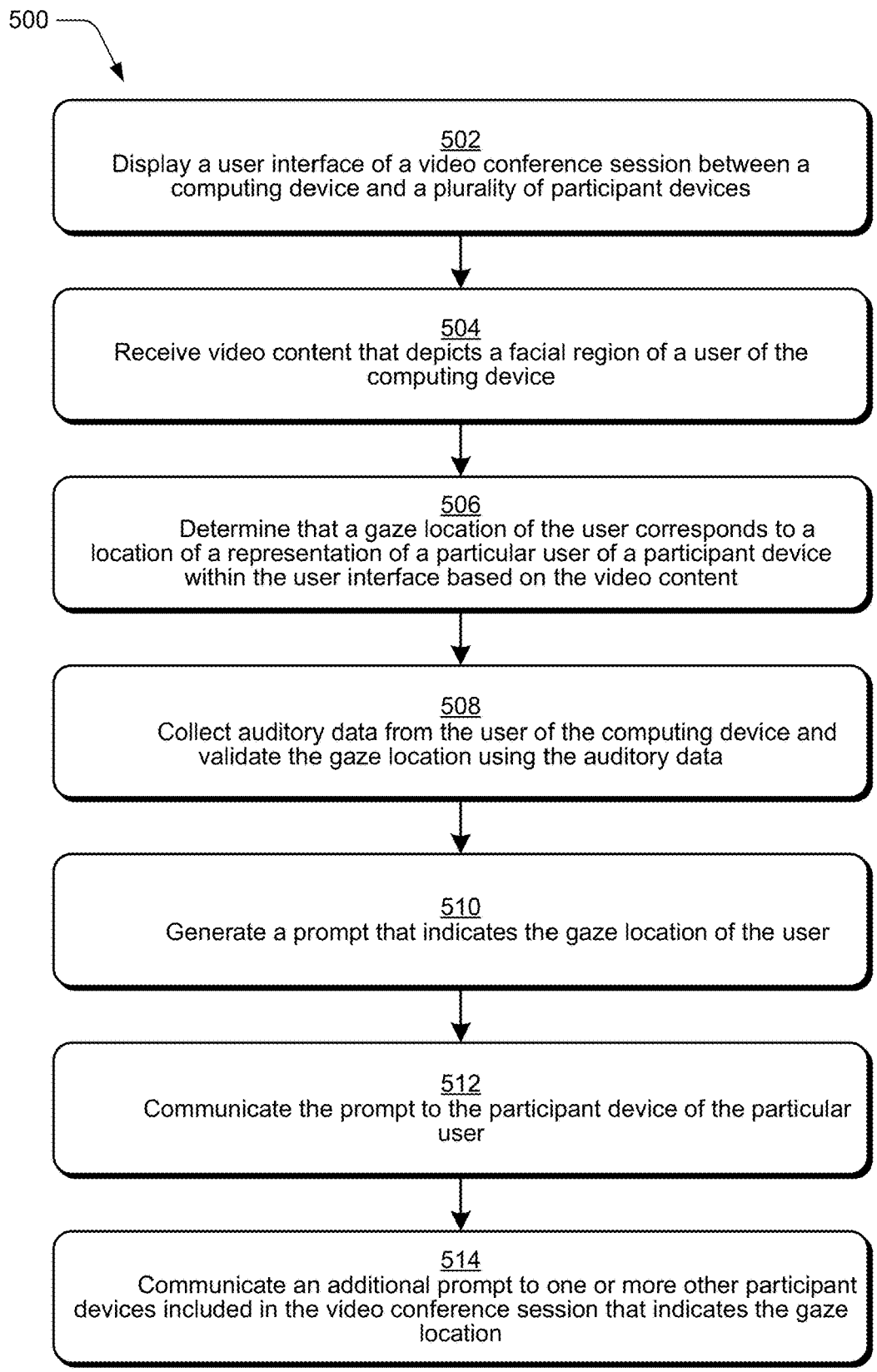
FIG. 5 is a flow diagram depicting an algorithm as a step-by-step procedure in an example implementation of gaze-based video conference prompts that is performable by a processing device to generate a prompt for communication to one or more devices in accordance with one or more implementations.

FIG. 5 is a flow diagram depicting an algorithm as a step-by-step procedure 500 in an example implementation of gaze-based video conference prompts that is performable by a processing device to generate a prompt for communication to one or more devices in accordance with one or more implementations. At 502, a user interface of a video conference session between a computing device and a plurality of participant devices is displayed. The video conference session, for instance, supports real time video and audio communication between the computing device, e.g., a speaker device 102, and the plurality of participant devices 104. The user interface 112 is configured to depict representations of users of each of the plurality of participant devices 104, such as tiles that depict live video feed of users of the respective participant devices 104.

At 504, video content that depicts a facial region of a user of the computing device is received. The computing device, for example, is the speaker device 102 and includes one or more media capture devices 108 to obtain the video content 126. At 506, a gaze location of the user is determined based on the video content. The gaze location, for instance, is determined to correspond to a location of a representation of a particular user of a participant device 104 within the user interface 112. In various examples, the gaze location is determined responsive to a determination that the user of the computing device is speaking. Additionally or alternatively, the gaze location is determined responsive to a determination that the video conference session includes a number of participant devices above a threshold.

At 508, auditory data from the user of the computing device is collected and the gaze location is validated using the auditory data. For instance, the computing device, e.g., the speaker device 102, collects auditory data using the media capture devices 108 in the course of the video conference session. In one example, the computing device extracts a name from the auditory data and compares the name to a name associated with the representation of the particular user.

At 510, a prompt that indicates the gaze location of the user is generated. Generally, the prompt 128 indicates the gaze location of the user of the computing device, e.g., "who" the user is looking at. In various examples, the prompt 128 includes a visual cue 130 to be displayed by one or more participant devices 104 that indicates that the user is looking at the representation of the particular user. The visual cue 130, for instance, can include an icon, a text-based message, badge, banner, and/or other visual effects to be displayed by one or more of the participant devices 104.

At 512, the prompt is communicated to the participant device of the particular user. Thus, the particular user is informed that the user of the computing device is looking at the particular user. At 514, an additional prompt is communicated to one or more other participant devices included in the video conference session. The additional prompt, for instance, indicates the gaze location of the user. In this way, other attendees of the video conference session are informed of where the user of the computing device is looking.

Figure 6:
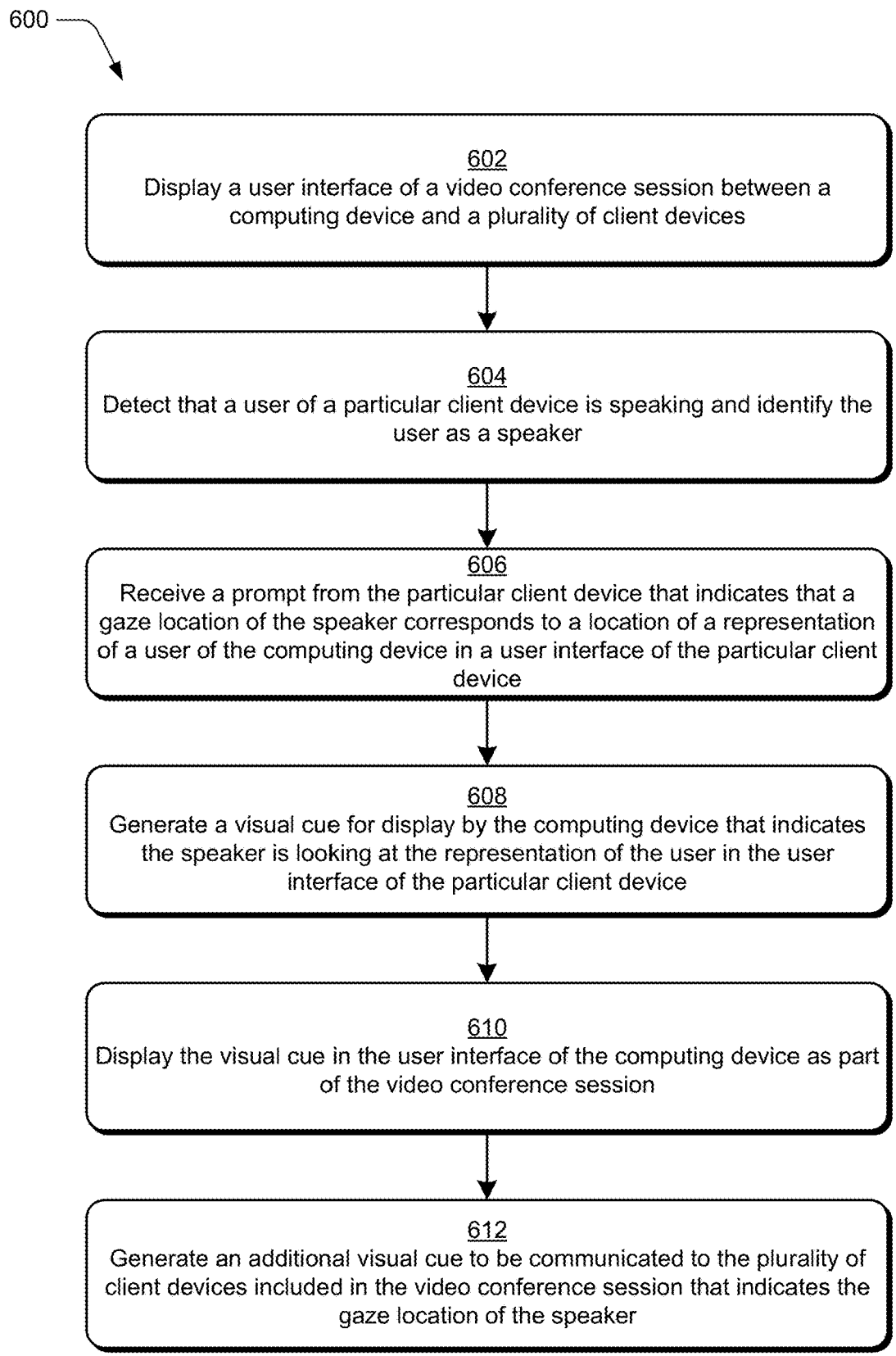
FIG. 6 is a flow diagram depicting an algorithm as a step-by-step procedure in an example implementation that is performable by a processing device to generate a visual cue for display in accordance with one or more implementations.

FIG. 6 is a flow diagram depicting an algorithm as a step-by-step procedure 600 in an example implementation that is performable by a processing device to generate a visual cue for display in accordance with one or more implementations. At 602, a user interface of a video conference session between the computing device and a plurality of client devices is displayed. The computing device, for instance, is representative of a participant device 104 that includes a user interface 124. The user interface 124 is configured to depict representations of users of the computing device and the client devices, e.g., attendees/participants in the video conference session.

At 604, a user of a particular client device is detected to be speaking. Accordingly, the computing device identifies the user as a speaker, such as via the content control module 114b. The particular client device, for instance, is representative of the speaker device 102. At 606, a prompt is received from the particular client device that indicates a gaze location of the speaker. The gaze location, for instance, corresponds to a location of a representation of a user of the computing device in a user interface of the particular client device, e.g., the user interface 112 of the speaker device 102.

Additionally or alternatively, the computing device (e.g., the participant device 104) is operable to receive video data and user interface data from the particular client device and determine the gaze location of the speaker based on the video data and the user interface data. Thus, in various examples the speaker device 102 determines the gaze location while in additional or alternative examples one or more of the participant devices 104 are able to determine the gaze location.

At 608, a visual cue is generated for display by the computing device. The visual cue 130, for instance, indicates that the speaker is looking at the representation of the user of the computing device in the user interface of the particular client device. The visual cue, for instance, can include an icon, a text-based message, badge, banner, and/or other visual effects to be displayed by the computing device. Further, in some examples, the visual cue 130 is associated with an auditory cue that indicates that the speaker is looking at the representation of the user of the computing device.

At 610, the visual cue is displayed in the user interface of the computing device as part of the video conference session. The visual cue 130 may be displayed for a predetermined period of time and/or removed once the gaze location changes. At 612, an additional visual cue is generated. The additional visual cue, for instance, is communicated to one or more of the plurality of client devices included in the video conference session that indicates the gaze location of the speaker.

Figure 7:
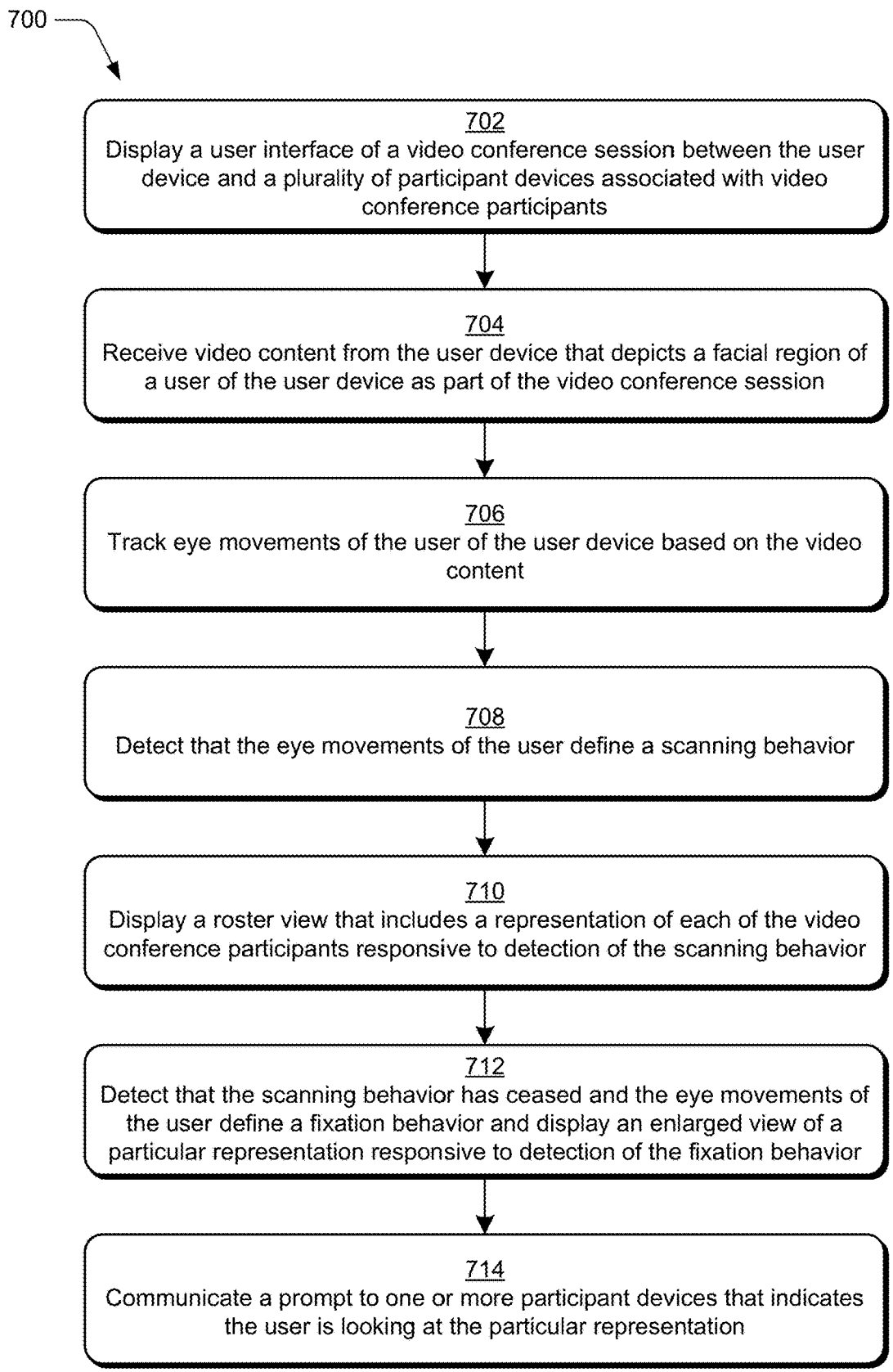
FIG. 7 is a flow diagram depicting an algorithm as a step-by-step procedure in an example implementation that is performable by a processing device to detect a scanning behavior and perform an action in accordance with one or more implementations.

FIG. 7 is a flow diagram depicting an algorithm as a step-by-step procedure 700 in an example implementation that is performable by a processing device to detect a scanning behavior and perform an action in accordance with one or more implementations. At 702, a user interface of a video conference session between a user device and a plurality of participant devices associated with video conference participants is displayed. The user device, for instance, is representative of the speaker device 102 that includes a user interface 112. The user interface 112 is configured to depict representations of users of the computing device and the participant devices 104.

At 704, video content is received from the user device that depicts a facial region of a user of the user device as part of the video conference session. The computing device, for example, is the speaker device 102 and includes one or more media capture devices 108 to obtain the video content 126. At 706, eye movements of the user of the user device are tracked based on the video content. For instance, the user device leverages one or more eye tracking algorithms to track the eye movements.

At 708, it is detected that the eye movements of the user define a scanning behavior. In an example, the scanning behavior is identified by determining that the eye movements match a predefined scanning pattern, e.g., the eye movements are searching around the user interface 112. At 710, a roster view is displayed responsive to detection of the scanning behavior. The roster view, for instance, includes a representation of each of the video conference participants. The user device is operable to configure the roster view based on a likelihood that the user is scanning for a particular representation of the video conference participants. In one example, the likelihood is based in part on auditory data included in the video content.

At 712, it is detected that the scanning behavior has ceased and the eye movements of the user define a fixation behavior. For instance, the gaze of the user is fixated on a particular representation. Responsive to the detection of the fixation behavior, an enlarged view of the particular representation is displayed. At 714, a prompt is communicated to one or more participant devices that indicates the user is looking at the particular representation. In various examples, the prompt 128 includes a visual cue 130 to be displayed by one or more of the participant devices 104. The visual cue 130, for instance, can include an icon, a text-based message, badge, banner, and/or other visual effects to be displayed by one or more of the participant devices 104. In this way, the techniques described herein provide a modality to improve user efficiency and enhance a user experience in an online video conference setting.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like.

Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 8:
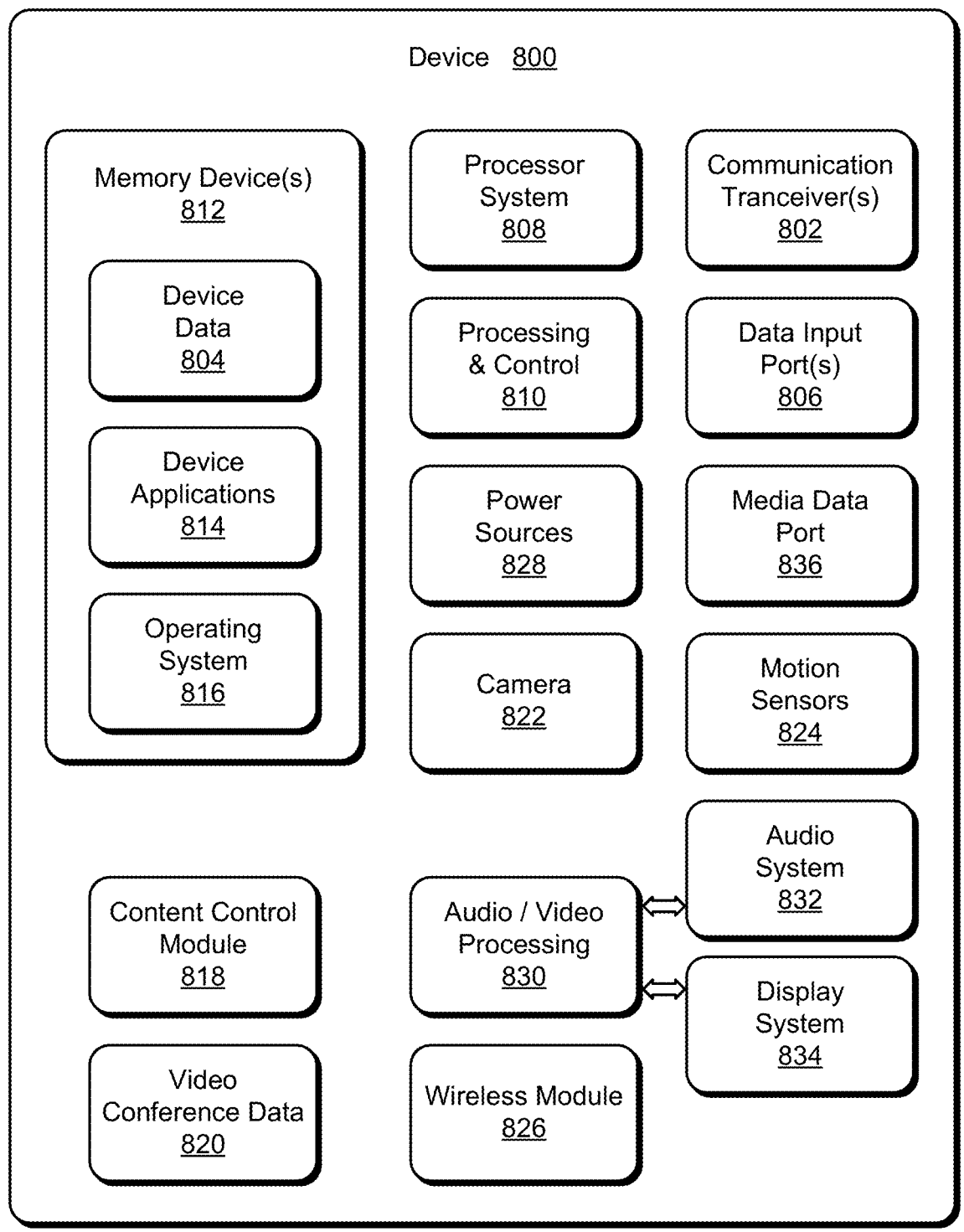
FIG. 8 illustrates various components of an example device in which aspects of gaze-based video conference prompts can be implemented.

FIG. 8 illustrates various components of an example device 800 in which aspects of gaze-based video conference prompts can be implemented. The example device 800 can be implemented as any of the devices described with reference to the previous FIGS. 1-7, such as any type of mobile device, mobile phone, mobile device, wearable device, tablet, computing, communication, entertainment, gaming, media playback, and/or other type of electronic device. For example, the speaker device 102 as shown and described with reference to FIGS. 1-7 may be implemented as the example device 800.

The device 800 includes communication transceivers 802 that enable wired and/or wireless communication of device data 804 with other devices. The device data 804 can include any of device identifying data, device location data, wireless connectivity data, and wireless protocol data. Additionally, the device data 804 can include any type of audio, video, and/or image data. Example communication transceivers 802 include wireless personal area network (WPAN) radios compliant with various IEEE 802.15 (Bluetooth™) standards, wireless local area network (WLAN) radios compliant with any of the various IEEE 802.11 (Wi-Fi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 800 may also include one or more data input ports 806 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 800 includes a processing system 808 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 810. The device 800 may further include any type of a system bus or other data and command transfer system that couples the various components within the device. A system bus can include any one or combination of different bus structures and architectures, as well as control and data lines.

The device 800 also includes computer-readable storage memory 812 (e.g., memory devices) that enable data storage, such as data storage devices that can be accessed by a computing device, and that provide persistent storage of data and executable instructions (e.g., software applications, programs, functions, and the like). Examples of the computer-readable storage memory 812 include volatile memory and non-volatile memory, fixed and removable media devices, and any suitable memory device or electronic data storage that maintains data for computing device access. The computer-readable storage memory can include various implementations of random-access memory (RAM), read-only memory (ROM), flash memory, and other types of storage media in various memory device configurations. The device 800 may also include a mass storage media device.

The computer-readable storage memory 812 provides data storage mechanisms to store the device data 804, other types of information and/or data, and various device applications 814 (e.g., software applications). For example, an operating system 816 can be maintained as software instructions with a memory device and executed by the processing system 808. The device applications may also include a device manager, such as any form of a control application, software application, signal-processing and control module, code that is native to a particular device, a hardware abstraction layer for a particular device, and so on. Computer-readable storage memory 812 represents media and/or devices that enable persistent and/or non-transitory storage of information in contrast to mere signal transmission, carrier waves, or signals per se. Computer-readable storage memory 812 do not include signals per se or transitory signals.

In this example, the device 800 includes a content control module 818 that implements aspects of gaze-based video conference prompts and may be implemented with hardware components and/or in software as one of the device applications 814. In an example, the content control module 818 can be implemented as the content control module 114a, 114b described in detail above. In implementations, the content control module 818 may include independent processing, memory, and logic components as a computing and/or electronic device integrated with the device 800. The device 800 also includes video conference data 820 for implementing aspects of gaze-based video conference prompts and may include data from and/or utilized by the content control module 818.

In this example, the example device 800 also includes a camera 822 and motion sensors 824, such as may be implemented in an inertial measurement unit (IMU). The motion sensors 824 can be implemented with various sensors, such as a gyroscope, an accelerometer, and/or other types of motion sensors to sense motion of the device. The various motion sensors 824 may also be implemented as components of an inertial measurement unit in the device.

The device 800 also includes a wireless module 826, which is representative of functionality to perform various wireless communication tasks. For instance, for the speaker device 102, the wireless module 826 can be leveraged to scan for and detect wireless networks, as well as negotiate wireless connectivity to wireless networks for the speaker device 102. The device 800 can also include one or more power sources 828, such as when the device is implemented as a mobile device. The power sources 828 may include a charging and/or power system, and can be implemented as a flexible strip battery, a rechargeable battery, a charged super-capacitor, and/or any other type of active or passive power source.

The device 800 also includes an audio and/or video processing system 830 that generates audio data for an audio system 832 and/or generates display data for a display system 834. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 836. In implementations, the audio system and/or the display system are integrated components of the example device. Alternatively, the audio system and/or the display system are external, peripheral components to the example device.

Although implementations of gaze-based video conference prompts have been described in language specific to features and/or methods, the subject of the appended claims is not necessarily limited to the specific features or methods described. Rather, the features and methods are disclosed as example implementations of gaze-based video conference prompts, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In some aspects, the techniques described herein relate to a computing device, including: a video capture device: a display device to display a user interface of a video conference session between the computing device and a plurality of participant devices, the user interface configured to depict representations of users of each of the plurality of participant devices; and a content control module implemented at least partially in hardware and configured to: receive video content captured by the video capture device that depicts a facial region of a user of the computing device: determine, based on the video content, that a gaze location of the user corresponds to a location of a representation of a particular user of a participant device within the user interface; and communicate a prompt to the participant device of the particular user that indicates the gaze location of the user.

In some aspects, the techniques described herein relate to a computing device, wherein the computing device determines the gaze location responsive to a determination that the user of the computing device is speaking.

In some aspects, the techniques described herein relate to a computing device, wherein the content control module is further configured to communicate an additional prompt to one or more other participant devices included in the video conference session that indicates that the gaze location corresponds to the particular user.

In some aspects, the techniques described herein relate to a computing device, wherein the content control module is further configured to collect auditory data from the user of the computing device and validate the gaze location using the auditory data.

In some aspects, the techniques described herein relate to a computing device, wherein the content control module determines the gaze location responsive to a determination that the video conference session includes a number of participant devices above a threshold and responsive to a determination that the user is speaking.

In some aspects, the techniques described herein relate to a computing device, wherein the representations of the users include a tile that displays a video feed captured by respective participant devices of the users and the gaze location corresponds to a location of one of the tiles.

In some aspects, the techniques described herein relate to a computing device, wherein the prompt includes a visual cue to be displayed by the participant device of the particular user that indicates that the user is looking at the representation of the particular user.

In some aspects, the techniques described herein relate to a computing device, wherein the visual cue includes one or more of an icon, a text-based message, or a visual effect to be displayed by the participant device of the particular user.

In some aspects, the techniques described herein relate to a computing device, wherein the prompt further includes an auditory cue that indicates that the user is looking at the representation of the particular user.

In some aspects, the techniques described herein relate to a computing device, including: a display device to display a user interface of a video conference session between the computing device and a plurality of client devices; and a content control module implemented at least partially in hardware and configured to: detect that a user of a particular client device of the plurality of client devices is speaking and identify the user as a speaker: receive a prompt from the particular client device that indicates that a gaze location of the speaker corresponds to a location of a representation of a user of the computing device in a user interface of the particular client device; and generate a visual cue for display by the computing device that indicates the speaker is looking at the representation of the user in the user interface of the particular client device.

In some aspects, the techniques described herein relate to a computing device, wherein the content control module is further configured to display the visual cue in the user interface of the computing device as part of the video conference session.

In some aspects, the techniques described herein relate to a computing device, wherein the visual cue includes one or more of an icon, a text-based message, or a visual effect to be displayed by the display device.

In some aspects, the techniques described herein relate to a computing device, wherein the visual cue is associated with an auditory cue that indicates that the speaker is looking at the representation of the user of the computing device.

In some aspects, the techniques described herein relate to a computing device, wherein the content control module is further configured to receive video data and user interface data from the particular client device and determine the gaze location of the speaker based on the video data and the user interface data.

In some aspects, the techniques described herein relate to a computing device, wherein the content control module is further configured to generate an additional visual cue to be communicated to the plurality of client devices included in the video conference session that indicates the gaze location of the speaker.

In some aspects, the techniques described herein relate to a method, including: displaying, by a display device of a user device, a user interface of a video conference session between the user device and a plurality of participant devices associated with video conference participants: receiving video content from the user device that depicts a facial region of a user of the user device as part of the video conference session: tracking eye movements of the user of the user device based on the video content: detecting that the eye movements of the user define a scanning behavior; and displaying, responsive to the detecting the scanning behavior, a roster view that includes a representation of each of the video conference participants.

In some aspects, the techniques described herein relate to a method, wherein the detecting the scanning behavior includes determining that the eye movements match a predefined scanning pattern.

In some aspects, the techniques described herein relate to a method, further including detecting that the scanning behavior has ceased and the eye movements of the user define a fixation behavior wherein a gaze of the user corresponds to a location of a particular representation, and displaying, responsive to the detecting the fixation behavior, an enlarged view of the particular representation.

In some aspects, the techniques described herein relate to a method, wherein the roster view is ordered based on a likelihood that the user is scanning for a particular representation of the video conference participants.

In some aspects, the techniques described herein relate to a method, wherein the likelihood is based in part on auditory data included in the video content.

The invention claimed is:

1. A computing device, comprising:
a video capture device;
a display device to display a user interface of a video conference session between the computing device and a plurality of participant devices, the user interface configured to depict representations of users of each of the plurality of participant devices;
at least one memory; and
at least one processor coupled with the at least one memory and configured to cause the computing device to:
receive video content captured by the video capture device that depicts a facial region of a user of the computing device;
determine, based on the video content, that a gaze location of the user corresponds to a location of a representation of a particular user of a participant device within the user interface; and
communicate a prompt that includes a visual cue to the participant device of the particular user, the visual cue to be displayed by the participant device on or in proximity to the representation of the particular user.

2. The computing device as described in claim 1, wherein the at least one processor causes the computing device to determine the gaze location responsive to a determination that the user of the computing device is speaking.

3. The computing device as described in claim 1, wherein the at least one processor is further configured to cause the computing device to communicate an additional prompt to one or more other participant devices included in the video conference session that indicates that the gaze location corresponds to the particular user.

4. The computing device as described in claim 1, wherein the at least one processor is further configured to cause the computing device to collect auditory data from the user of the computing device and validate the gaze location using the auditory data.

5. The computing device as described in claim 1, wherein the at least one processor is further configured to cause the computing device to determine the gaze location responsive to a determination that the video conference session includes a number of participant devices above a threshold and responsive to a determination that the user is speaking.

6. The computing device as described in claim 1, wherein the representations of the users include tiles that display video feeds captured by respective participant devices of the users and the gaze location corresponds to a location of one of the tiles.

7. The computing device as described in claim 1, wherein the visual cue includes one or more of an icon, a text-based message, or a visual effect to be displayed by the participant device of the particular user.

8. The computing device as described in claim 1, wherein the prompt further includes an auditory cue that indicates that the user is looking at the representation of the particular user.

9. A computing device, comprising:
a display device to display a user interface of a video conference session between the computing device and a plurality of client devices;
at least one memory; and
at least one processor coupled with the at least one memory and configured to cause the computing device to:
detect that a first user of a particular client device of the plurality of client devices is speaking and identify the first user as a speaker;
receive a prompt from the particular client device that indicates that a gaze location of the speaker corresponds to a location of a representation of a second user of the computing device in an additional user interface of the particular client device; and
generate a visual cue for display by the computing device, the visual cue displayed on or in proximity to the representation of the second user.

10. The computing device as described in claim 9, wherein the at least one processor is further configured to cause the computing device to display the visual cue in the user interface of the computing device as part of the video conference session.

11. The computing device as described in claim 9, wherein the visual cue includes one or more of an icon, a text-based message, or a visual effect to be displayed by the display device.

12. The computing device as described in claim 9, wherein the visual cue is associated with an auditory cue that indicates that the speaker is looking at the representation of the second user of the computing device.

13. The computing device as described in claim 9, wherein the at least one processor is further configured to cause the computing device to receive video data and user interface data from the particular client device and determine the gaze location of the speaker based on the video data and the user interface data.

14. The computing device as described in claim 9, wherein the at least one processor is further configured to cause the computing device to generate an additional visual cue to be communicated to the plurality of client devices included in the video conference session that indicates the gaze location of the speaker.

15. A method, comprising:
displaying, by a display device of a user device, a user interface of a video conference session between the user device and a plurality of participant devices associated with video conference participants;
receiving video content from the user device that depicts a facial region of a user of the user device as part of the video conference session;
tracking eye movements of the user of the user device based on the video content;
detecting that the eye movements of the user define a scanning behavior; and
changing, responsive to the detecting the scanning behavior, the user interface to display a roster view that includes a representation of each of the video conference participants, the roster view including at least one representation of at least one participant that was previously excluded from the user interface.

16. The method as described in claim 15, wherein the detecting the scanning behavior includes determining that the eye movements match a predefined scanning pattern that includes multiple eye movements in contrasting directions.

17. The method as described in claim 15, further comprising detecting that the scanning behavior has ceased and the eye movements of the user define a fixation behavior wherein a gaze of the user corresponds to a location of a particular representation, and displaying, responsive to the detecting the fixation behavior, an enlarged view of the particular representation.

18. The method as described in claim 15, wherein the roster view is ordered based on a likelihood that the user is scanning for a particular representation of the video conference participants.

19. The method as described in claim 18, wherein the likelihood is based in part on auditory data included in the video content.

20. The method of claim 16, wherein detecting the scanning behavior includes detecting the predefined scanning pattern without fixation on a location in the user interface.

* * * * *